(12) United States Patent
Kocher et al.

(10) Patent No.: US 8,949,624 B2
(45) Date of Patent: Feb. 3, 2015

(54) METHOD AND SYSTEM FOR SECURE ACCESS TO NON-VOLATILE MEMORY

(75) Inventors: Paul C. Kocher, San Francisco, CA (US); Joshua M. Jaffe, San Francisco, CA (US); Benjamin C. Jun, Menlo Park, CA (US); Carter C. Laren, San Francisco, CA (US); Peter K. Pearson, Livermore, CA (US); Nathaniel J. Lawson, Oakland, CA (US)

(73) Assignee: Irdeto USA, Inc., Santa Clara, CA (US)

( * ) Notice: Subject to any disclaimer, the term of this patent is extended or adjusted under 35 U.S.C. 154(b) by 0 days.

(21) Appl. No.: 13/175,238

(22) Filed: Jul. 1, 2011

(65) Prior Publication Data

US 2011/0264923 A1    Oct. 27, 2011

Related U.S. Application Data

(63) Continuation of application No. 10/614,765, filed on Jul. 7, 2003, now Pat. No. 7,987,510, which is a continuation-in-part of application No. 10/113,363, filed on Mar. 27, 2002, now abandoned.

(60) Provisional application No. 60/279,323, filed on Mar. 28, 2001.

(51) Int. Cl.
*G06F 21/00* (2013.01)
*H04N 7/167* (2011.01)
(Continued)

(52) U.S. Cl.
CPC .............. *H04N 7/1675* (2013.01); *G06F 21/50* (2013.01); *G06F 21/6281* (2013.01);
(Continued)

(58) Field of Classification Search
CPC  H04N 7/1675; H04L 9/3236; H04L 2209/60; G06F 21/78; G06F 21/50; G06F 21/62; G06F 21/6281

USPC .......................................................... 726/193
See application file for complete search history.

(56) References Cited

U.S. PATENT DOCUMENTS

| 4,598,288 A | 7/1986 | Yarbrough et al. |
| 4,890,319 A | 12/1989 | Seth-Smith et al. |

(Continued)

FOREIGN PATENT DOCUMENTS

| AU | 199960042 B2 | 4/2000 |
| CN | 1245926 A | 3/2000 |

(Continued)

OTHER PUBLICATIONS

"U.S. Appl. No. 10/614,765, Final Office Action mailed Oct. 22, 2008", 27 pgs.

(Continued)

*Primary Examiner* — Jeffrey D Popham
(74) *Attorney, Agent, or Firm* — Marc S. Kaufman; Reed Smith LLP

(57) ABSTRACT

Technologies are disclosed to transfer responsibility and control over security from player makers to content authors by enabling integration of security logic and content. An exemplary optical disc carries an encrypted digital video title combined with data processing operations that implement the title's security policies and decryption processes. Player devices include a processing environment (e.g., a real-time virtual machine), which plays content by interpreting its processing operations. Players also provide procedure calls to enable content code to load data from media, perform network communications, determine playback environment configurations, access secure nonvolatile storage, submit data to CODECs for output, and/or perform cryptographic operations. Content can insert forensic watermarks in decoded output for tracing pirate copies. If pirates compromise a player or title, future content can be mastered with security features that, for example, block the attack, revoke pirated media, or use native code to correct player vulnerabilities.

19 Claims, 5 Drawing Sheets

(51) Int. Cl.

| | | |
|---|---|---|
| *G06F 21/50* | (2013.01) | |
| *G06F 21/62* | (2013.01) | |
| *G06F 21/78* | (2013.01) | |
| *G11B 20/00* | (2006.01) | |
| *H04N 21/258* | (2011.01) | |
| *H04N 21/41* | (2011.01) | |
| *H04N 21/418* | (2011.01) | |
| *H04N 21/426* | (2011.01) | |
| *H04N 21/4405* | (2011.01) | |
| *H04N 21/442* | (2011.01) | |
| *H04N 21/8358* | (2011.01) | |
| *H04L 9/32* | (2006.01) | |
| *H04N 5/913* | (2006.01) | |

(52) U.S. Cl.
CPC ............ *G06F 21/78* (2013.01); *G06F 21/62* (2013.01); *G11B 20/00086* (2013.01); *G11B 20/00115* (2013.01); *G11B 20/0021* (2013.01); *G11B 20/00231* (2013.01); *G11B 20/00246* (2013.01); *G11B 20/00253* (2013.01); *G11B 20/00449* (2013.01); *G11B 20/00659* (2013.01); *G11B 20/00818* (2013.01); *G11B 20/00884* (2013.01); *H04L 2209/60* (2013.01); *H04N 21/25816* (2013.01); *H04N 21/4135* (2013.01); *H04N 21/4181* (2013.01); *H04N 21/42646* (2013.01); *H04N 21/4405* (2013.01); *H04N 21/44236* (2013.01); *H04N 21/8358* (2013.01); *H04N 2005/91342* (2013.01); *H04N 2209/606* (2013.01); *H04L 9/3236* (2013.01); *H04L 2209/56* (2013.01); *H04L 9/3249* (2013.01)
USPC ........................................................ 713/193

(56) References Cited

U.S. PATENT DOCUMENTS

| | | |
|---|---|---|
| 5,172,413 A | 12/1992 | Bradley et al. |
| 5,191,611 A | 3/1993 | Lang |
| 5,214,702 A | 5/1993 | Fischer |
| 5,315,448 A | 5/1994 | Ryan |
| 5,323,244 A | 6/1994 | Yamaguchi et al. |
| 5,343,527 A | 8/1994 | Moore |
| 5,392,351 A | 2/1995 | Hasebe et al. |
| 5,418,853 A | 5/1995 | Kanota |
| 5,450,489 A | 9/1995 | Ostrover et al. |
| 5,513,260 A | 4/1996 | Ryan |
| 5,574,787 A | 11/1996 | Ryan |
| 5,590,194 A | 12/1996 | Ryan |
| 5,606,612 A | 2/1997 | Griffin et al. |
| 5,613,004 A | 3/1997 | Cooperman et al. |
| 5,638,443 A | 6/1997 | Stefik et al. |
| 5,646,999 A | 7/1997 | Saito |
| 5,668,954 A | 9/1997 | Feder et al. |
| 5,687,236 A | 11/1997 | Moskowitz et al. |
| 5,802,592 A | 9/1998 | Chess et al. |
| 5,822,436 A | 10/1998 | Rhoads |
| 5,859,950 A | 1/1999 | Iwamoto |
| 5,862,218 A | 1/1999 | Steinberg |
| 5,889,919 A | 3/1999 | Inoue et al. |
| 5,903,650 A | 5/1999 | Ross et al. |
| 6,041,316 A | 3/2000 | Allen |
| 6,064,967 A | 5/2000 | Speicher |
| 6,141,681 A | 10/2000 | Kyle |
| 6,164,853 A | 12/2000 | Foote |
| 6,272,631 B1 | 8/2001 | Thomlinson et al. |
| 6,288,989 B1 * | 9/2001 | Ro et al. ................... 369/47.13 |
| 6,289,455 B1 | 9/2001 | Kocher et al. |
| 6,314,409 B2 | 11/2001 | Schneck et al. |
| 6,314,565 B1 | 11/2001 | Kenner et al. |
| 6,393,568 B1 | 5/2002 | Ranger et al. |
| 6,470,450 B1 | 10/2002 | Langford et al. |
| 6,487,663 B1 | 11/2002 | Jaisimha et al. |
| 6,496,898 B1 | 12/2002 | Tsutsui |
| 6,529,950 B1 | 3/2003 | Lumelsky et al. |
| 6,542,610 B2 | 4/2003 | Traw et al. |
| 6,598,162 B1 | 7/2003 | Moskowitz |
| 6,687,384 B1 | 2/2004 | Isnardi |
| 6,738,932 B1 * | 5/2004 | Price ........................ 714/38.11 |
| 6,744,891 B1 | 6/2004 | Allen |
| 6,782,190 B1 | 8/2004 | Morito |
| 6,820,063 B1 | 11/2004 | England et al. |
| 6,859,789 B1 | 2/2005 | Hayashi |
| 6,889,207 B2 | 5/2005 | Slemmer et al. |
| 6,931,534 B1 | 8/2005 | Jandel et al. |
| 6,937,553 B1 | 8/2005 | Mitui |
| 6,957,343 B2 | 10/2005 | Ripley et al. |
| 6,999,587 B1 | 2/2006 | Asano et al. |
| 7,065,216 B1 | 6/2006 | Benaloh et al. |
| 7,984,511 B2 | 7/2011 | Kocher et al. |
| 7,996,913 B2 | 8/2011 | Kocher et al. |
| 8,055,910 B2 | 11/2011 | Kocher et al. |
| 8,131,646 B2 | 3/2012 | Kocher et al. |
| 2002/0004903 A1 | 1/2002 | Kamperman et al. |
| 2002/0026638 A1 | 2/2002 | Eldering et al. |
| 2002/0035492 A1 | 3/2002 | Nonaka |
| 2002/0071553 A1 | 6/2002 | Shirai et al. |
| 2002/0087871 A1 | 7/2002 | Ripley |
| 2002/0116533 A1 | 8/2002 | Holliman et al. |
| 2002/0124251 A1 | 9/2002 | Hunter et al. |
| 2002/0141582 A1 | 10/2002 | Kocher et al. |
| 2002/0152387 A1 | 10/2002 | Asano |
| 2003/0018895 A1 | 1/2003 | Morrison |
| 2003/0046238 A1 | 3/2003 | Nonaka et al. |
| 2003/0061615 A1 | 3/2003 | VanDerMeulen |
| 2004/0039911 A1 | 2/2004 | Oka et al. |
| 2004/0111608 A1 | 6/2004 | Oom Temudo de Castro et al. |
| 2004/0133794 A1 | 7/2004 | Kocher et al. |
| 2004/0153648 A1 | 8/2004 | Rotholtz et al. |
| 2007/0033419 A1 | 2/2007 | Kocher et al. |
| 2008/0072040 A1 | 3/2008 | Asano |
| 2008/0101604 A1 | 5/2008 | Kocher |
| 2008/0133938 A1 | 6/2008 | Kocher et al. |
| 2008/0137848 A1 | 6/2008 | Kocher et al. |
| 2011/0255690 A1 | 10/2011 | Kocher et al. |
| 2011/0264923 A1 | 10/2011 | Kocher et al. |

FOREIGN PATENT DOCUMENTS

| | | |
|---|---|---|
| EP | 0668695 A2 | 8/1995 |
| EP | 0696121 A1 | 2/1996 |
| EP | 0717337 A1 | 6/1996 |
| EP | 0982725 A2 | 3/2000 |
| IN | 247794 | 5/2011 |
| JP | 09163339 A | 6/1997 |
| JP | 1188659 A | 3/1999 |
| JP | 11185383 A | 7/1999 |
| JP | 11232775 A | 8/1999 |
| JP | 200090567 A | 3/2000 |
| JP | 2000163883 A | 6/2000 |
| JP | 2000175188 A | 6/2000 |
| JP | 2001006278 A | 1/2001 |
| JP | 2001023297 A | 1/2001 |
| WO | 9725798 | 7/1997 |
| WO | WO-9829869 A1 | 7/1998 |
| WO | WO-9858306 A1 | 12/1998 |
| WO | WO-0021087 A2 | 4/2000 |
| WO | WO-0031964 A1 | 6/2000 |
| WO | WO-0059152 A2 | 10/2000 |
| WO | WO-0113199 A1 | 2/2001 |
| WO | WO-0113199 A1 | 2/2001 |
| WO | WO-0113571 A1 | 2/2001 |
| WO | WO-2005008385 A2 | 1/2005 |

OTHER PUBLICATIONS

"U.S. Appl. No. 10/614,765, Non Final Office Action mailed Feb. 25, 2008", 19 pgs.

"U.S. Appl. No. 11/982,190, Advisory Action mailed Jun. 16, 2010", 3 pgs.

"U.S. Appl. No. 11/982,190, Examiner Interview Summary Received Aug. 25, 2010", 4 pgs.

(56) References Cited

OTHER PUBLICATIONS

"U.S. Appl. No. 11/982,190, Response filed Dec. 21, 2009 to Non Final Office Action mailed Oct. 2, 2009", 11 pgs.
"U.S. Appl. No. 11/982,190, Response filed Sep. 22, 2010", 14 pgs.
"U.S. Appl. No. 11/985,190, Notice of Allowance mailed Mar. 28, 2011", 11 pgs.
"Australian Application No. 2010200153, Office Action Response", 33 pgs, 2011.
"Australian Application Serial No. 2004258523, Examiner's First Report mailed Aug. 4, 2009", 3 pgs.
"Australian Application Serial No. 2004258523, Response filed Sep. 25, 2009 to Examiner's First Report mailed Aug. 4, 2009", 42 pgs.
"Indian Application Serial No. 479/CHENP/2006, Office Action mailed Jan. 18, 2011", 8 pgs.
"Indian Application Serial No. 479/CHENP/2006, Response filed Mar. 1, 2011 to Office Action mailed Jan. 18, 2011", 3 pgs.
"Japanese Application Serial No. 2006-518845, Office Action Response Filed Jun. 20, 2011", 15.
"Japanese Application Serial No. 2006-518845, Response filed Jan. 20, 2011 to Office Action mailed Oct. 20, 2010", 9 pgs.
"U.S. Appl. No. 13/163,038 Non Final Office Action mailed Jun. 22, 2012", 11 pgs.
"Australian Application No. 2010200153, Office Action Response dated Feb. 22, 2011"; 33 pgs.
Office Action, U.S. Appl. No. 13/163,038, dated Dec. 7, 2012, 6 pages.
"U.S. Appl. No. 10/563,793, Examiner Interview Summary mailed Aug. 25, 2010", 4 pgs.
"U.S. Appl. No. 10/563,793, Supplemental Notice of Allowability mailed Oct. 4, 2011", 2 pgs.
"U.S. Appl. No. 10/614,765, Examiner Interview Summary mailed Aug. 18, 2009", 4 pgs.
"U.S. Appl. No. 11/981,977, Notice of Allowance mailed Jun. 24, 2011", 14 pgs.
"U.S. Appl. No. 13/175,238, Non Final Office Action mailed Apr. 19, 2012", 7 pgs.
"U.S. Appl. No. 13/175,238, Preliminary Amendment filed Jul. 1, 2011", 3 pgs.
"U.S. Appl. No. 13/175,238, Response filed Aug. 16, 2012 to Non Final Office Action mailed Apr. 19, 2012", 6 pgs.
"Chinese Application Serial No. 200810111442.8, Office Action received Jul. 13, 2011", 4 pgs.
"Japanese Application Serial No. 2006-518845, Office Action Response Filed Jun. 20, 2011", 15 pgs.
"U.S. Appl. No. 10/563,793, Advisory Action mailed Jul. 17, 2009", 3 pgs.
"U.S. Appl. No. 10/563,793, Final Office Action mailed May 7, 2009", 24 pgs.
"U.S. Appl. No. 10/563,793, Non Final Office Action mailed Oct. 28, 2008", 13 pgs.
"U.S. Appl. No. 10/563,793, Non Final Office Action mailed Dec. 9, 2010", 8 pgs.
"U.S. Appl. No. 10/563,793, Non-Final Office Action mailed Jan. 19, 2010", 18 pgs.
"U.S. Appl. No. 10/563,793, Non-Final Office Action mailed Jul. 7, 2010", 24 pgs.
"U.S. Appl. No. 10/563,793, Notice of Allowance mailed Mar. 17, 2011", 11 pgs.
"U.S. Appl. No. 10/563,793, Preliminary Amendment filed Jan. 6, 2006", 7 pgs.
"U.S. Appl. No. 10/563,793, Preliminary Amendment filed Oct. 31, 2007", 6 pgs.
"U.S. Appl. No. 10/563,793, Response filed Jan. 13, 2009 to Non Final Office Action mailed Oct. 28, 2008", 15 pgs.
"U.S. Appl. No. 10/563,793, Response filed Apr. 7, 2010 to Non Final Office Action mailed Jan. 9, 2010", 18 pgs.
"U.S. Appl. No. 10/563,793, Response filed Jul. 7, 2009 to Final Office Action mailed May 7, 2009", 12 pgs.
"U.S. Appl. No. 10/563,793, Response filed Dec. 22, 2010 to Non Final Office Action mailed Dec. 9, 2010", 16 pgs.

"U.S. Appl. No. 10/563,793, Response filed Sep. 22, 2010 to Non Final Office Action mailed Jul. 7, 2010", 21 pgs.
"U.S. Appl. No. 10/614,765, Examiner Interview Summary May 20, 2008", 2 pgs.
"U.S. Appl. No, 10/614,765, Final Office Action mailed Oct. 22, 2008", 27 pgs.
"U.S. Appl. No. 10/614,765, Final Office Action mailed Dec. 14, 2009", 27 pgs.
"U.S. Appl. No, 10/614,765, Non Final Office Action mailed Feb. 25, 2008", 19 pgs.
"U.S. Appl. No. 10/614,765, Non Final Office Action mailed Jun. 4, 2007", 19 pgs.
"U.S. Appl. No. 10/614,765, Non-Final Office Action mailed Apr. 28, 2009", 26 pgs.
"U.S. Appl. No. 10/614,765, Non-Final Office Action mailed Aug. 9, 2010", 28 pgs.
"U.S. Appl. No. 10/614,765, Notice of Allowance mailed Mar. 17, 2011", 9 pgs.
"U.S. Appl. No. 10/614,765, Preliminary Amendment mailed Feb. 11, 2005", 8 pgs.
"U.S. Appl. No. 10/614,765, Response filed Feb. 13, 2009 to Final Office Action mailed Oct. 22, 2008", 16 pgs.
"U.S. Appl. No. 10/614,765, Response filed Mar. 28, 2007 to Restriction Requirement mailed Jan. 3, 2007", 7 pgs.
"U.S. Appl. No. 10/614,765, Response filed Jul. 23, 2008 to Non Final Office Action mailed Feb. 25, 2008", 12 pgs.
"U.S. Appl. No. 10/614,765, Response filed Aug. 27, 2009 to Non Final Office Action mailed Apr. 28, 2009", 15 pgs.
"U.S. Appl. No. 10/614,765, Response filed Jan. 10, 2011 to Non Final Office Action mailed Aug. 9, 2010", 15 pgs.
"U.S. Appl. No. 10/614,765, Response filed Dec. 1, 2007 to Non Final Office Action mailed Jun. 4, 2007", 14 pgs.
"U.S. Appl. No. 10/614,765, Response filed Jun. 10, 2010 to Final Office Action mailed Dec. 14, 2009", 14 pgs.
"U.S. Appl. No. 10/614,765, Restriction Requirement mailed Jan. 3, 2007", 5 pgs.
"U.S. Appl. No. 11/981,977, Final Office Action mailed Apr. 8, 2010", 13 pgs.
"U.S. Appl. No. 11/981,977, Non Final Office Action mailed Sep. 1, 2009", 18 pgs.
"U.S. Appl. No. 11/981,977, Non Final Office Action mailed Dec. 28, 2010", 15 pgs.
"U.S. Appl. No. 11/981,977, Response filed May 31, 2011 to Non Final Office Action mailed Dec. 28, 2010", 11 pgs.
"U.S. Appl. No. 11/981,977, Response filed Dec. 31, 2009 to Non Final Office Action mailed Sep. 1, 2009", 10 pgs.
"U.S. Appl. No. 11/981,977, Response filed Sep. 8, 2010 to Final Office Action mailed Apr. 8, 2010", 10 pgs.
"U.S. Appl. No. 11/981,990, Final Office Action mailed Sep. 13, 2010", 15 pgs.
"U.S. Appl. No. 11/981,990, Non Final Office Action mailed Feb. 26, 2010", 18 pgs.
"U.S. Appl. No. 11/981,990, Notice of Allowance mailed Mar. 18, 2011", 10 pgs.
"U.S. Appl. No. 11/981,990, Notice of Allowance mailed May 23, 2011", 2 pgs.
"U.S. Appl. No. 11/981,990, Response filed Jan. 13, 2011 to Final Office Action mailed Sep. 13, 2010", 9 pgs.
"U.S. Appl. No. 11/981,990, Response filed Jun. 29, 2010 to Non Final Office Action mailed Feb. 26, 2010", 13 pgs.
"U.S. Appl. No. 11/981,990, Response filed Nov. 24, 2009 to Restriction Requirement mailed Oct. 30, 2009", 9 pgs.
"U.S. Appl. No. 11/981,990, Restriction Requirement mailed Oct. 30, 2009", 6 pgs.
"U.S. Appl. No. 11/982,190, Advisory Action mailed Jun. 16, 2006", 3 pgs.
"U.S. Appl. No. 11/982,190, Examiner Interview Summary Received Aug. 25, 2010", 4 pgs,.
"U.S. Appl. No. 11/982,190, Final Office Action mailed Mar. 29, 2010", 15 pgs.
"U.S. Appl. No. 11/982,190, Non Final Office Action mailed Oct. 2, 2009", 14 pgs.

(56) References Cited

OTHER PUBLICATIONS

"U.S. Appl. No. 11/982,190, Non Final Office Action mailed Dec. 9, 2010", 7 pgs.

"U.S. Appl. No. 11/982,190, Non-Final Office Action mailed Jul. 20, 2010", 32 pgs.

"U.S. Appl. No. 11/982,190, Response filed May 19, 2010 to Final Office Action mailed Mar. 29, 2010", 15 pgs.

"U.S. Appl. No. 11/982,190, Response filed Dec. 21, 2009 to Non Final Office Action mailed Dec. 2, 2009", 11 pgs.

"U.S. Appl. No. 11/982,190, Response filed Dec. 22, 2010 to Non Final Office Action mailed Dec. 9, 2010", 12 pgs.

"U.S. Appl. No. 11/982,190, Response filed Sep. 22, 2010", 14 pgs, 2011.

"U.S. Appl. No, 11/985,190, Notice of Allowance mailed Mar. 28, 2011", 11 pgs.

"Australian Application No. 2010200153, Office Action Response", 33 pgs.

"Australian Application Serial No, 2004258523, Examiner's First Report mailed Aug. 4, 2009", 3 pgs.

"Australian Application Serial No. 2004258523, Response filed Sep. 25, 2009 to Examiner's First Resort mailed Aug. 4, 2009", 42 pgs.

"Australian Application Serial No. 2010200153, First Examiner Report mailed Nov. 8, 2010", 2 pgs.

"Australian Application Serial No. 2010200153, Examiner Report mailed Mar. 1, 2011", 2 Pgs.

"Chinese Application Serial No. 2004800239483, First Office Action mailed Sep. 7, 2007", (English Translation), 5 pgs.

"Chinese Application Serial No. 200810082299.4, Office Action Response mailed Feb. 10, 2011", 92 pgs.

"Chinese Application Serial No. 2008100822994, Office action mailed Oct. 23, 2009", 6 pgs.

"European Application Serial No. 04756690.6, Office Action Mailed Sep. 1, 2008", 15 pgs.

"European Application Serial No. 04756690.6, Office Action Response Filed Oct. 26, 2010", 9 pgs.

"European Application Serial No. 08075213.2, Extended European Search Report mailed Jun. 3, 2008", 8 pgs.

"Indian Application Serial No. 479/CHEMP/2006, Office Action mailed Jan. 18, 2011", 8 pgs.

"Indian Application Serial No, 479/CHENP/2006, Response filed Mar. 1, 2011 to Office Action mailed Jan. 18, 2011", 3 pgs.

"Japanese Application Serial No. 2006-518845, Final Office Action mailed Mar. 18, 2011", 5 Pgs.

"Japanese Application Serial No. 2006-518845, Office Action mailed Oct. 21, 2010", 6 pgs.

"Japanese Application Serial No, 2006-518845, Response filed Jan. 20, 2011 to Office Action mailed Oct. 20, 2010", 9 pgs.

"Korean Application Serial No. 10-2006-7000444, Office Action mailed Oct. 29, 2010", 3 pgs.

"Korean Application Serial No. 10-2006-7000444, Amendment filed Mar. 30, 2010", 19 pgs.

"Korean Application Serial No. 10-2006-7000444, Office Action mailed Jan. 30, 2010", 3 pgs.

"Korean Application Serial No. 10-2006-7000444, Office Action Response mailed Jan. 31, 2011", 13 pgs.

Anderson, Ross, "Information Hiding", Lecture Notes in Computer Science, First International Workshop, Cambridge, U.K., Proceedings, Springer, (May 30-Jun. 1, 1996), 185 pgs.

Ford, Susan, "Advanced Encryption Standard (AES) Questions and Answers", [Online], Retrieved from the Internet: <URL: http://www.nist.goy/public_affairs/releases/aesq&a.htm>, (Oct. 2, 2000), 1-5.

Simmons, Gustavus, "Contemporary Cryptology", IEEE Press, (1991), 7 pgs.

\* cited by examiner

METHOD AND SYSTEM FOR SECURE ACCESS TO NON-VOLATILE MEMORY

CROSS-REFERENCE TO RELATED APPLICATIONS

This application is a continuation of and claims the benefit of priority under 35 U.S.C. §120 to U.S. patent application Ser. No. 10/614,765, filed Jul. 7, 2003, which is a continuation-in-part of and claims the benefit of priority under 35 U.S.C. §120 to U.S. patent application Ser. No. 10/113,363, filed Mar. 27, 2002, which claims the benefit of priority under 35 U.S.C. §119(e) to U.S. Provisional Application Ser. No. 60/279,323, filed Mar. 28, 2001, the benefit of priority of each of which is claimed hereby, and each of which are incorporated by reference herein in its entirety.

FIELD

This application relates generally to securing the distribution of digital content against piracy and other unauthorized use or redistribution.

BACKGROUND

A wide variety of systems have been proposed for protecting digital content. Most such schemes encrypt the content to protect it against unauthorized use and copying while it is stored on media or sent over untrusted communication channels. Decryption algorithms and keys are then managed by trusted, tamper-resistant software or hardware modules, which are designed to enforce access control rules (which may be fixed or configurable) specifying how the content can be used.

Content protection schemes are generally customized for a particular playback environment. For example, anti-piracy systems in software-only streaming content players designed for personal computers lack the security benefits of tamper resistant hardware but can generally be upgraded without great difficulty (e.g., if the user uninstalls the player and downloads an updated version from the manufacturer web site). As a result, such systems may provide less robust security than hardware-based players, but the consequences of an attack are relatively small since upgraded security features can be deployed by modifying the content stream and requiring that users upgrade their software.

In contrast, protection methods embedded in consumer electronics hardware devices that play optical media are notoriously difficult to upgrade. Security challenges include the long lifetime of optical media (which prevents security upgrades that are not backward-compatible), the lack of a convenient and reliable way to deliver updates to players, and the lack of standardization between player implementations. These difficulties, combined with the long lifetime of playback devices and the consumer expectation that all new content will play on old players, make it extremely difficult to introduce security upgrades. As a consequence, most consumer electronics devices provide little or no real protection against copying, and the few content protection standards that are deployed in consumer electronics devices tend to be simple, rigid schemes that offer little flexibility and renewability. FIG. 1 diagrams a typical content protection system of the background art. Content player 100 includes software in nonvolatile program memory 105, which implements the player's security policies 110, decryption code 120, and player keys 130. This code and keys are used by processor 140 to validate whether the content read from media 150 is valid and, if so, to decrypt the content and supply the results to output interface 160. Examples of protection systems like the one shown in FIG. 1 include the copy control scheme used with digital audio tape, the content scrambling system (CSS) intended to protect DVD video, and the CPPM scheme proposed for protecting DVD audio.

A variety of different technologies are known in the background art:

Access control policies: A wide variety of access policies, and methods for specifying such policies, are known in the background art. For example, the software protection system of U.S. Pat. No. 4,658,093 to Hellman uses a straightforward authorization code issued by a publisher. In contrast, U.S. Pat. No. 5,982,891 to Ginter et al. describes a variety of very complex access rules involving a large number of participants. Standards for encoding access policies (both for use with content distribution and other applications) have also been proposed, such as PolicyMaker and the X.509 certificate format.

Anti-virus software: Methods for detecting and blocking known viruses, Trojan horses, and other malicious code are well known in the background art. These methods generally involve scanning for attributes of known viruses, such as known instruction sequences. These programs can work in a variety of ways, such as scanning files during start-up, scanning files on-the-fly, scanning programs as they execute, scanning memory, scanning new media, scanning network communications, etc.

Content protection systems and DRMs: A wide variety of content protection systems (which are also sometimes called Digital Rights Management (DRM) systems) have been proposed. DRM systems of the background art generally provide for content to be distributed in encrypted form, then supply decryption keys or perform decryption operations for legitimate purchasers. Many features have been proposed or included in commercial DRMs, including support for superdistribution (where encrypted content can be exchanged between users), pay-per-use billing (including off-line pay-per-use with reporting via a telephone line), variable billing rates (charging different amounts based on promotions, number or duration of uses, requested user operations, user history, etc.), protection for various data types (audio, video, text, software, etc.), support for various formats, and support for various playback device types (portable, set-top, computer-based with hardware assistance, software-only, etc.)

Copy protection: Methods for copy protecting personal computer software are known and are widely deployed for some kinds of software such as computer games. These methods often involve binding a software program to physical media that are designed to be difficult to copy (e.g., by intentionally incorporating errors or nonstandard formatting that are difficult to replicate). Other copy protection systems involve securing the installation process, e.g. by requiring that users obtain an authorization code from a server. In some cases, copy protection features are designed into a system. In others cases (including copy protection systems used for computer software, videocassette tapes, and audio CDs), copy protection is implemented by producing media with nonstandard encoding that allows playback on most players but will confuse most attempts to copy the media. A major design challenge for copy protection systems is to minimize the impact on legitimate users (i.e., obtain high playability and user acceptance) while preventing undesirable actions as effectively as possible (i.e., obtaining good security).

Cryptographic functions: A wide variety of basic cryptographic functions are known, including block ciphers, hash functions, digital signature systems (and other public key systems), key management systems, etc. For more information about basic cryptography, see *Applied Cryptography* by Bruce Schneier.

Cryptographic oracles: Using block ciphers or other cryptographic functions, it is possible to construct "cryptographic oracles" which apply a secret cryptographic transformation to arbitrary externally-supplied input messages and return the results. Cryptographic oracles can be constructed so that it is computationally infeasible for an attacker who knows the oracle's algorithms and protocols to determine the oracle's keys. In addition, because the number of possible inputs to an oracle can be extremely large (e.g., $2^{256}$ for an oracle constructed from a 256-bit block cipher), it is not feasible for an attacker to anticipate or pre-compute the responses to random queries.

Interpreters, emulators, and virtual machines: A variety of interpreted computer languages are known in the background. Some interpreted languages, such as Java, require a compilation process to convert source code into an executable or interpretable form. In contrast, most BASIC interpreters operate directly on the source code. Some interpreters allow self-modifying code, while others do not. Technology for implementing interpreters and for emulating assembly languages is also known in the background art. For example, sophisticated emulators such as Virtual PC and SoftWindows can run programs designed for Microsoft Windows on Apple Mac computers. Virtual machine (VM) designs, such as those used for Java and JavaCard, are known, and it is also known that VMs can interact with native code on the computer, or call other VM functions in different memory spaces. (Many Java implementations provide these capabilities.) Interpreted languages are commonly used for applications or where cross-platform compatibility is required, such as for creating processor-independent device driver formats. (See, for example, *Writing FCode 2.x Programs*, Sun Microsystems, 1993, page 5.)

Key management: A wide variety of methods for assigning and managing cryptographic keys have been proposed. It is known that devices can have device-specific keys, group keys, public keys, private keys, certificates, etc. Keys can be assigned to individual devices, to selected groups of devices (e.g. as described in U.S. Pat. No. 5,592,552 to Fiat), to all devices, etc. Devices can contain a variety of keys of different types, including symmetric keys, public keys (e.g., to verify certificates and digital signatures) and asymmetric private keys.

Media: Media technologies are known that can offer tremendous storage capacity, low manufacturing cost, and good durability. Examples of current media technologies include optical discs (CD, DVD, etc.), magnetic media, flash memory, and ROMs. Newer technologies, such as holographic memories, are also being developed. It is known that a single piece of media can include data of many different types. For example, a compact disc can contain standard Red Book audio tracks as well as a data session for use on personal computers (e.g., containing software, compressed bonus tracks, images, videos, lyrics, etc.) Compact discs for use for use in personal computers can contain both encrypted content as well as the playback software required to play the content.

Network communication: Sophisticated data networks, including the Internet, are known. These networks can provide flexible, reliable, high-bandwidth data communication. Although networks with a physical connection usually provide higher bandwidth, wireless communication channels are also popular.

Renewable security: In some cases, it is not practical to produce a security system that is guaranteed to be able to prevent all possible attacks. As a result, it is desirable that it be possible to renew security after an attack, e.g. by discontinuing the use of any compromised keys and correcting the vulnerability. Although renewable security is desirable, many deployed and proposed systems lack any effective recovery mechanism for many kinds of attacks.

Sandboxing: Sandboxing involves executing software programs in a controlled environment where the program is unable to access any operations that could damage the system. The Java "virtual machine" supports sandboxing so that untrusted applets (such as those downloaded over the Internet) can be executed.

Security modules: Many security systems employ removable security modules so that the security upgrades can be performed without the difficulty or expense of replacing other portions of the system. For example, removable security modules are used in many pay television systems.

Software updates: Secure software updates can be performed by receiving a proposed software update, verifying a digital signature or message authentication code validating the update, then (if the signature is valid) performing the update. For example, it is known that digital audio players can receive code updates, verify digital signatures or message authentication codes on the updates, and (if valid) update their code. Methods for ensuring that updates are applied in the correct order (e.g., using sequence counters) and for recovering from failed or unsuccessful updates (e.g., by reverting to previous software versions or by activating special recovery code) are also known. It is also known that software updates can be delivered via virtually a wide variety of distribution mechanisms, such as the Internet, optical media, ROM cartridges, etc. Software updates have been used to prevent pay television piracy by distributing code updates with the signal to descramblers, which apply and successfully execute the new code to compute the correct decryption key for the next video segment. These updates are commonly used to prevent unauthorized viewing by disabling or even destroying unauthorized descramblers.

Steganography: Steganography involves hiding information in data. For example, it is known that encrypted data can be placed in the least-significant bits of an image or sound recording. An attacker who obtains this image or recording but does not know the decryption key cannot even determine whether there is any hidden data because low-order bits often appear random and ciphertext produced by a strong encryption algorithm cannot be distinguished from random data without the key.

Tamper resistance: Many methods are known for designing and constructing devices that are resistant to attack. Tamper resistant hardware is commonly used in systems where it is desirable to prevent attackers from reverse engineering devices or extracting keys from cryptographic modules. For example, Wave Systems markets a tamper-resistant microprocessor-based integrated circuit product called "Embassy" which can be integrated with content players or general-purpose computers and is advertised for use in securing the distribution of digital content. Methods for implementing tamper resistant software have also been proposed (see, for example, U.S. Pat. No. 5,892,899 to Aucsmith et al.).

Traitor Tracing: Traitor tracing schemes have been proposed to identify the source of compromises or attacks, typically by tracing keys used in unauthorized devices back to a customer particular or compromised device.

Watermarking: Watermarks are signals embedded in content that can be detected by a specialized detector but do not affect (or minimally affect) human perception of the content when played. Watermarks embedded in pictures, sound recordings, and images have been used by copyright holders to indicate that copying is not authorized. "Robust" watermarks are known that can withstand conversions between formats (including re-recording from analog outputs) and provide varying degrees of security against attacks attempting to remove the watermark. In contrast, "fragile" watermarks have little or no ability to withstand format conversions but are easier to design and can carry more information.

Although no anti-piracy system can completely prevent all possible attacks, systems of the background art fail to provide practical solutions to solvable problems such as casual piracy using digital-to-digital copying or high-speed ripping of protected formats to unprotected formats. Significant limitations of many systems of the background art include, without limitation:

Reliance on global secrets: Many protection systems require that cryptographic algorithms, keys, and other information needed for decoding be kept secret. As a result, the decoding process cannot be documented in open standards documents without compromising the security of the system. Also, if a large number of implementations are available, attackers can potentially break the entire scheme by attacking the weakest implementation. (Such an attack recently occurred with the DVD video protection system.) While such systems are useful in closed single-vendor environments, they cannot be standardized and do not provide effective long-term security.

Lack of standardization: Content publishers have already committed to a variety of data formats and decryption algorithms that are incompatible. Different content protection systems enable different business models, and publishers who have committed to one model are likely to oppose any security system that requires a different model.

Incompatibility with product types: Many security features cannot be integrated with all product types. For example, downloadable software-only players for personal computers cannot include tamper-resistant hardware. Similarly, frequent software updates are difficult to deliver to players lacking Internet connectivity.

User interface: Many proposals involve complex user interfaces. Security should be invisible to honest users. Users are likely to reject schemes that require explicit user involvement (e.g., to obtain or enter authorization codes). In general, consumer electronics devices such as car stereos and video disc players must be easy-to-use, since many users must be satisfied even if they do not read documentation, are intimidated by technology, have poor eyesight or other handicaps, or lack fluency in the languages supported by the player.

Legal challenges: Some security systems require cooperation between competitors. Such cooperation can be illegal due to antitrust regulations.

Lack of manufacturer benefit: Manufacturers will oppose security features that increase player cost, time-to-market, prevent the inclusion of legitimate features, or otherwise make their products less effective or desirable. Although advances in semiconductor technology are decreasing the cost required to implement security systems, effective tamper-resistant hardware remains difficult and expensive to design and produce. As a result, content protection systems that rely on manufacturers to produce good implementations will fail unless they provide a real marketplace advantage to manufacturers whose offerings are more secure.

Indefinite security policies: Effective security systems must specify rules or other decision-making procedures for determining whether to allow or prevent user-requested specific actions. In many systems, these rules or procedures are not well specified.

Inflexible security policies: It is desirable for content protection systems to have the flexibility to support different models for different publishers, content types, jurisdictions, playback environments, etc. Systems should offer the necessary flexibility without becoming too complex.

Weak long-term security: Security systems must be robust and flexible enough to remain effective for a long time. Few content protection systems of the background art could last more than a few years as part of a high-profile format, while a popular format can last for more than 30 years.

Untraceability of attacks: If attacks do occur, systems should be able to identify the source of the attack so that the compromised (or misused) device can be revoked and so that criminals can be prosecuted.

SUMMARY

The present application relates to various embodiments, and aspects, of a standardizable content protection system that can be implemented in a manner providing flexible and renewable content protection across a wide variety of interoperable platforms.

The system provides participants (manufacturers, publishers, artists, and/or consumers, etc.) with unparalleled flexibility to make decisions about security and functionality.

An exemplary player usable with the system (i.e., a device that wishes to decrypt or otherwise gain access to protected content) includes several components. The first is a data or media input interface, such as for an optical disc drive. To initiate playback, the player loads a sequence of data processing commands from the input interface and begins executing these commands using an interpreter or other execution module. This execution environment preferably provides a Turing-complete language (one that can execute any algorithm, subject to the player's memory, user interface, and performance limitations). From the execution environment, the content can query the player to determine the configuration of the playback environment and to perform cryptographic operations using the player's keys. Content can thus be designed so that playback will only proceed on players that provide satisfactory responses to queries. Publishers can also provide limited playback. For example, less secure platforms could provide CD-quality stereo audio or regular-definition images, while more secure platforms could offer more audio channels, high-definition images, higher sampling rates, and higher-quality compression. Even after playback begins, playback can remain under the control of the content's data processing commands. One exemplary embodiment includes the capability to perform robust, essentially on-the-fly watermarking. Enabling the content itself to control what data regions are played, makes it possible to embed information in the output by selecting between output data versions with tiny differences. Pirate copies can be traced back to a specific player by analyzing these differences.

Because the content contains and enforces its own security policies, attacks that occur can be addressed by designing and issuing new content that is resistant. The flexibility afforded by allowing content to enforce its own security policies also allows support for artists' preferences, regional "fair use" regulations, etc. New player features can be added easily by adding new content-accessible player functions.

From a business perspective, it is desirable that any content protection system be usable to unite content publishers and consumer electronics manufacturers in the common goal of providing the best possible security consistent with their business and operational constraints. The systems disclosed herein allow publishers to determine their own security requirements then allow the content itself to implement policies that consider a wide variety of factors and determine whether (or how) to play in each environment. Also, manufacturers can be motivated to design products that offer good security and do not facilitate piracy so that their customers will have the broadest-possible access to content.

DETAILED DESCRIPTION

U.S. patent application Ser. No. 10/113,363 is hereby incorporated by reference in its entirety.

Figure 1:
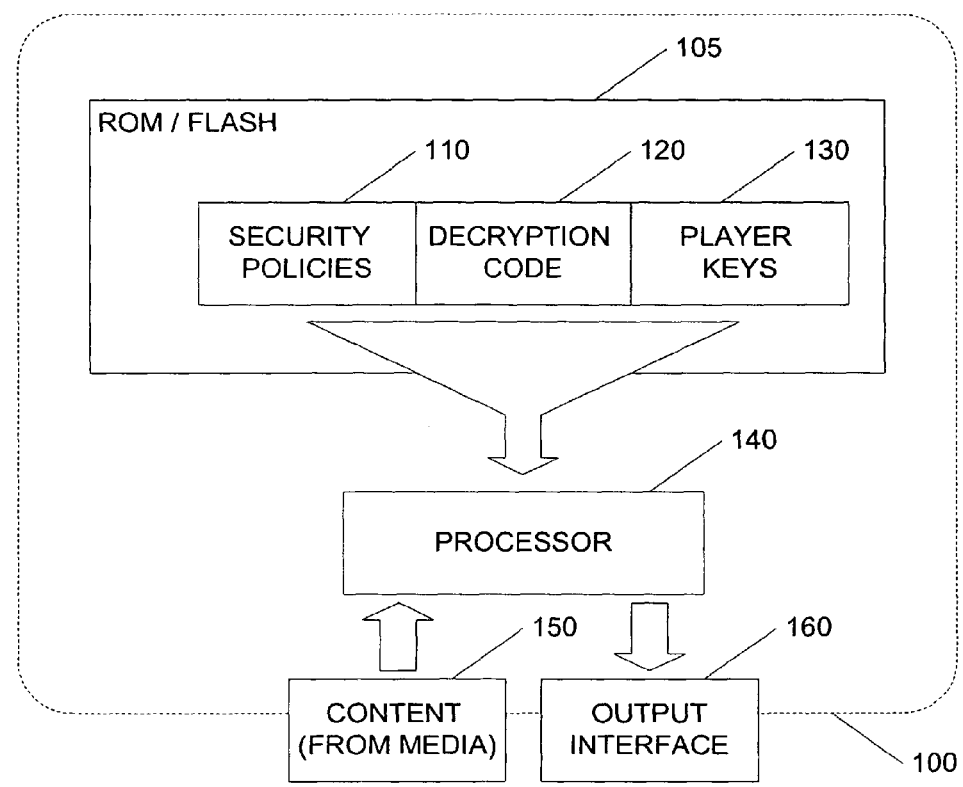
FIG. 1 shows a media player using content protection methods of the background art.
Figure 2:
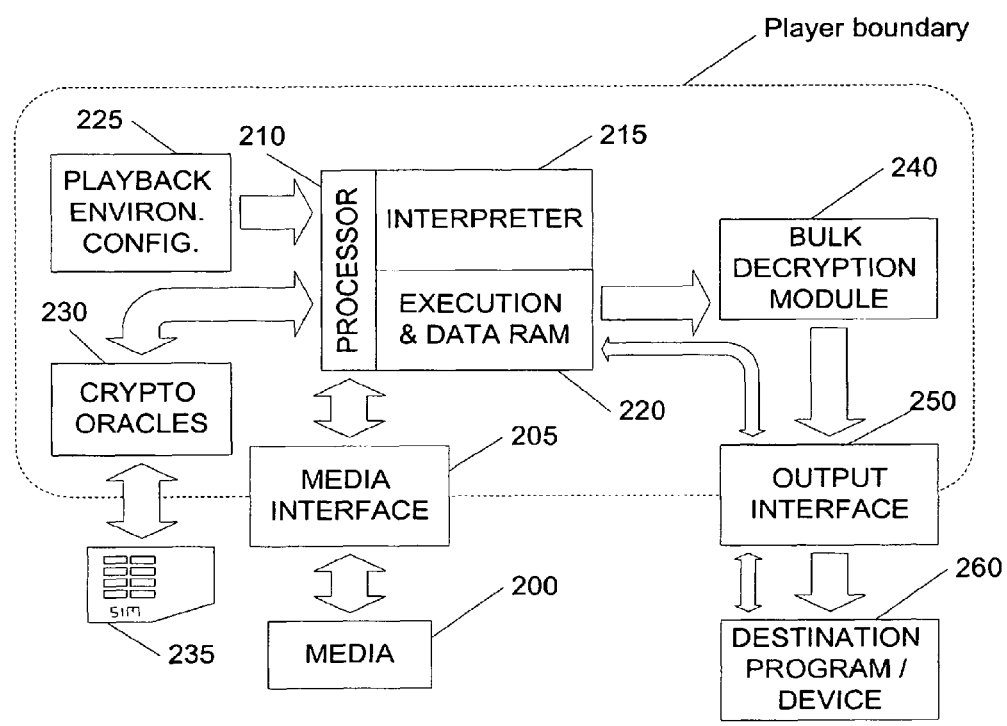
FIG. 2 illustrates an exemplary media player using content protection methods disclosed herein.
Figure 3:
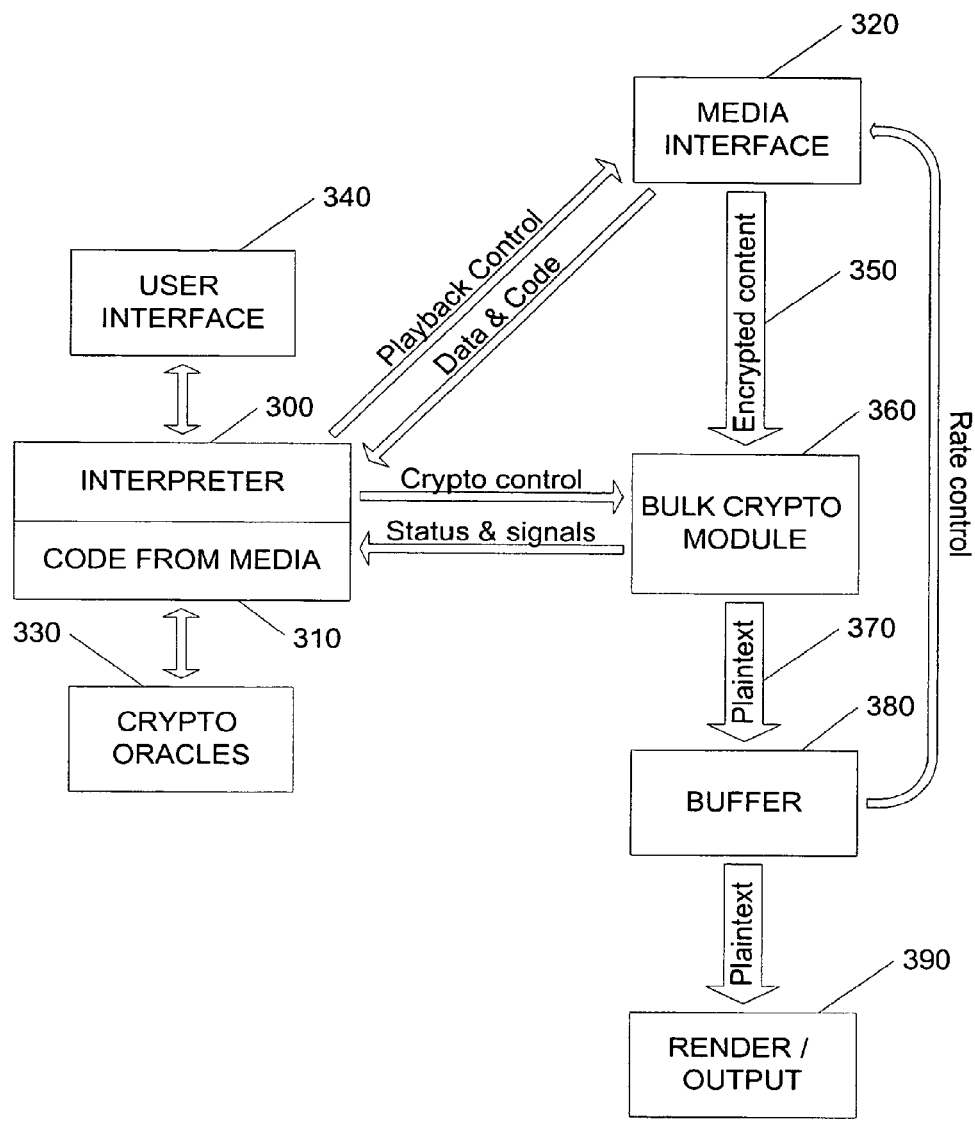
FIG. 3 illustrates the decryption portion of an exemplary embodiment.

FIG. 2 shows an exemplary embodiment of a player using physical media 200. The playback process is controlled by processor 210, which can access media 200 via media interface 205. When media 200 is mounted (e.g., when it is first inserted, or the system is re-initialized, etc.), processor 210 begins by initializing the media interface, reading the media's table of contents, and recognizing the protection system supported. If so, the processor loads a small initial portion of media 200 into execution and data RAM 220.

Using interpreter 215, processor 210 begins performing the data processing operations specified by the loaded media portion. Interpreter 215 provides a set of predetermined data processing operations from which more complex tasks can be accomplished. The interpreted language is preferably Turing-Complete. Turing-Complete programming languages are characterized in that algorithms implementable in one such language can be implemented in any other, and the implementations will have similar asymptotic performance characteristics. Examples of Turing Complete programming languages include without limitation C, C++, BASIC, Fortran, Pascal, Java, and virtually all assembly languages.

The loaded portion proceeds by invoking procedure calls provided by interpreter 215. Although the initial data loaded into RAM 220 may be relatively small, code running on interpreter 215 can load additional data (including code) from the media via procedure calls, thereby allowing more complex operations to be performed.

Other procedure calls allow the content to determine the playback environment configuration 225. The content can thus analyze the playback environment characteristics (e.g., player type, requested user action, etc.) to determine if playback should proceed. In an exemplary embodiment, if correctable problems are detected (e.g., if the media contains a security firmware upgrade for the player), these can be addressed. If supported, the content can also query output interface 250 and, if supported, destination program/device 260 (e.g., amplifier, digital speakers, speaker driver, etc.) to check security characteristics, load cryptographic keys, specify output parameters (e.g., to specify reduced output quality if security is uncertain), etc.

In an exemplary embodiment, the content can also query cryptographic oracles 230, which may be implemented in an external removable security module 235 (such as a smart card, etc.) to allow for security hardware upgrades. Oracles can also be implemented, without limitation, in processor 210, other hardware in the player, in media, in attached devices such as speakers, etc. Cryptographic oracles 230 can provide the content with verifiable proof of the player's identity. Results from queries to oracles 230 can be used in decrypting subsequent content or code portions, thereby providing strong cryptographic assurance that players lacking valid keys (or whose keys are revoked) cannot decrypt the content.

In an exemplary embodiment, the interpreter executes the data processing commands specified by the content in a "sandbox," meaning that the content does not have access to cryptographic secrets (such as oracle keys) that could otherwise compromise the player. Sandboxing is useful where not all content is necessarily trustworthy. For example, an attacker could try to produce malicious content that attempted to extract the cryptographic keys from players. (Additional information about exemplary cryptographic oracles and their operation is provided below.)

If the content determines that playback should not proceed (for example if a user is attempting to make a copy and the content is configured to prohibit copying), the content can report an error and reject the requested action. Alternatively, the content can control the rendering and/or output processes to reduce the quality of the output so that unauthorized copies will be degraded and therefore less attractive.

If the content determines that playback should proceed, the content then awaits a signal from the player specifying that playback should begin from a specific location on the media (e.g., a particular track). Interpreter 215 processes the request using the data processing instructions loaded into execution/data RANI 220 when the media was mounted. If the content decides that playback should proceed, it uses procedure calls to direct media interface 205 to begin loading encrypted content from the appropriate location on media 200. The content specifies valid decryption keys and parameters to bulk decryption module 240, which retrieves the encrypted content from RAM 220 (or, alternatively, directly from media interface 205) and decrypts it. The decrypted content is then supplied to output interface 250, which converts it to the appropriate analog or digital format for destination program or device 260. As playback continues, the data processing instructions being processed by interpreter 215 can load new decryption parameters, specify new blocks of data to read from media 200, etc. When playback completes, the content can re-initialize the RAM 220.

Additional information is provided in the following sections about the interpreter, the playback system, and other embodiments and aspects.

Responding to Attacks

Anti-piracy systems implemented widely in software and in low-cost consumer electronics devices cannot prevent all possible attacks. The techniques disclosed herein are usable, following an attack, to facilitate mastering new content in ways that substantially block the existing attacks. While professional pirates may try to continuously seek out and install new circumvention systems, casual piracy will involve an ongoing struggle to develop and maintain attack tools and will hopefully therefore be more difficult than simply purchasing content legitimately. The following sections describe how the techniques described herein can be used to address some common attacks.

A first category of attack involves attempts to use uncompromised players to perform unauthorized actions. For example, content can be mastered to allow copying from original media but disallow copying from copies. If an attempt is made to copy such content from a copy (which the content could, for example, recognize by detecting modifications inserted during the copying process or by comparing the current media's serial number and/or type with the original), playback can be blocked by the interpreter code. Alternatively, the interpreter can allow content to play with reduced fidelity (such as playing stereo audio with a 44.1 kilohertz sample rate even though multi-channel audio with a higher sample rate might be available), or by inserting additional anti-piracy warnings. Thus, by analyzing information provided to the interpreter, inappropriate user requests can be detected and handled on non-compromised players.

A second category of attack involves compromise of a player's cryptographic keys. If a player's cryptographic keys have been compromised, an attacker could (at least in theory) emulate the compromised playback environment completely by emulating the cryptographic oracles and (optionally) providing false responses to queries about the playback environment. Security can be re-established after such an attack by making the interpreted code in future content require at least one cryptographic key that was not present in the compromised device. If a particular player model or manufacturer is the source of many attacks (e.g., because the player implementation has inadequate security), publishers can create content that will not play (or will play at reduced quality) on such platforms.

A third category of attack involves compromising a particular piece of content or a group of titles containing similar interpreter security code. Such attacks could potentially be mounted by modifying the content itself to bypass security checks or by producing a malicious interpreter tailored to play the target title. Such attacks can be addressed by deploying different or better protection software in future content.

A fourth category of attack involves copying content from protected media to unprotected formats, then redistributing the content in the new format. No content protection system can completely prevent such attacks, but the techniques and systems disclosed herein provide for powerful, flexible watermarking capabilities that can be used to trace a compromise back to a particular device which can then be revoked to prevent future attacks. Because the number of users who actively upload content for piracy is relatively small, piracy can be reduced significantly by identifying and revoking these users' players. Imperceptible differences can be introduced in the decryption output by selectively skipping portions of the ciphertext. For example, in an exemplary embodiment, the content can watermark a "zero" bit by directing the player's decryption module to decrypt and output a first ciphertext portion then skip a second ciphertext portion. To watermark a "one" bit, the content can direct the module to skip the first ciphertext portion and output the second one. By encoding a series of such bits, the content can be watermarked with any data available to the interpreter code, including without limitation the identity of the player, results of cryptographic operations, user action descriptions, output device information, etc. If a pirated copy of the content is discovered, the watermarks can be analyzed to trace the illegal copy back to a single player, which can then be revoked in future content releases. This capability is also useful for law enforcement and forensic purposes, since it is possible to prove with certainty that a particular copy originated from a particular player. Features for tracing copies can also serve as a disincentive to piracy since people considering making illegal copies will be discouraged by the knowledge that they could be identified, caught, and prosecuted.

Of course, no consumer-friendly anti-piracy system can reliably prevent all possible attacks in all environments. For example, audio and video can be recorded from analog outputs. (Even if watermarks are embedded in content, recorders without watermark detectors are available.) Data captured from analog outputs can then be re-mastered onto new digital or analog media and redistributed without the original's security features. Similarly, copies made by professional pirates who have equipment required to make exact copies of media cannot be detected by the player, but the techniques and systems disclosed herein can help to prevent media cloning. For example, disc manufacturer identifiers on media can be checked by content to ensure that honest or careless duplicating facilities will not be duped by pirates. Media type identifiers can prevent content sold on read-only media from being redistributed on recordable media. For players with Internet, telephone/modem, or other network support, content can (for example) obtain authentication from a server prior to playback (or the first playback) to validate that the media is valid. Players with nonvolatile storage can even store a table of known-bad media serial numbers, which the content and/or player can query to determine whether the media has been revoked.

Querying and Controlling the Playback Environment

The content can be configured to decide whether it will allow itself to be decoded. To assist with this decision, the player can provide the content with information about the playback environment. Although very limited information (such as the user's requested action and the player model) may be adequate in many cases, more detailed and accurate information is desirable so that the content can make a more informed assessment as to whether playback should proceed. Although the specific information and capabilities provided to the content depend on the player implementation, the following describes (without limitation) some exemplary functions and capabilities that can be provided to content. Note that for players constructed out of multiple connected components (such as output ports, connected output devices, operating system device drivers, security modules, etc.), some or all of the following information may be provided for these connected devices as well as the main part of the player containing the interpreter.

Security Support Information: Security specification version, supported query functions, and/or security module form factor (replaceable hardware, embedded hardware, updateable firmware, ROM firmware, PC software, etc.), etc. (Exemplary cryptographic processing functions and playback control/decryption functions are discussed in detail below.)

Manufacturer Information: Name, identifier, web site, public key/certificate, manufacturing batch, manufacture date/time, region of manufacture, country of manufacture, manufacturer address, technical support contact information, and/or manufacturer warranty information, etc.

Device Information: Product line, serial number, model number, firmware/software versions, device public key/certificate identifiers, GPS location or other physical location/region, content supported Codec types, network/Internet support information, network addresses, device telephone number, IP address, watermark support, interpreter performance ratings, security certification ratings, device distributor(s), device retailer, device form factor, and/or security specifications, etc.

User Information: User name, geographical region, country, address, GPS location or other physical location/region/country/etc., user telephone number, IP address, e-mail address, web address, preferred language, tolerances for controversial material, preferred payment methods/accounts, payment limits, purchase history, and/or privacy preferences, etc.

Media Control: Query media format, recordable vs. non-recordable, media serial number, recording device type, recording device owner, recording device serial number, recording device security information, and/or recording device watermark-checking capabilities, etc. Functions can also allow reading from media, writing to media, formatting media, testing media, and/or ejecting media, etc. Additional functions can provide access to cryptographic functions or other special capabilities supported by particular media formats.

Requested User Operation: For example, play, record, translate to new format, load to portable device, make first copy, make multiple copies, and/or simultaneous play/record, etc. The content can also be given the ability to initiate or modify requested operations.

Output Information: Information about output ports, output port configurations, output port security characteristics, connected devices, output data format, and/or output data quality/resolution, etc. If supported, content can directly query output devices, to obtain additional information about the device, and/or request cryptographic operations, etc. The player can also allow the content to modify these parameters, for example to specify reduced-quality output if security is poor.

Environment: Identities/hashes/versions of other running programs and device to drivers on the platform; contents or hashes of memory; versions of installed attack detection modules; results of system scans for attacks, and/or status of tamper detectors, etc. These functions can also allow the content to modify memory, e.g. to correct security weaknesses in other programs.

Time: Date, time, time zone, elapsed clock cycle count, time since last reset, time since manufacture, time since last security upgrade, time since last battery change, and/or estimated battery life remaining, etc.

Connectivity: Determine player communication capabilities, check current connection status, establish network connections, establish modem connections, specify criticality of establishing network connections, check/specify connection security characteristics, transmit data, receive data, close connections, and/or idle connections, etc.

User Interface: Display user messages, display lyrics, display graphics images, print graphics images, display advertising/promotional messages, identify available user interface controls, obtain user input, play speech to the user using a player's speech synthesizer, and/or error reporting, etc.

Watermark Control: Select content regions to output, select external watermarking algorithms, control external watermark detectors, and/or check mark detector status, etc.

Other: Player/playback status information, pay-per-play billing control (e.g., player-based funding sources), error handling, playback termination, secure nonvolatile memory support (see below), apply player firmware update, and/or invoke external modules (such as dynamically linked libraries), etc.

Some standardization of functions and parameters is useful to ensure interoperability between implementations (e.g., so that content can function effectively in player environments designed after the content was originally published) and to simplify the task of authoring secure content. Standardization is particularly helpful for functions where a variety of different manufacturers' products should provide the same types of information or operations. For example, a function and response codes to allow the content to determine the player form factor (home audio/video, portable, automotive, personal computer software-only, personal computer software with hardware assistance, professional studio, movie theater, etc.) can be standardized. Standardization has the additional benefit of preventing manufacturers from trying to avoid security controls by reporting pertinent risk-related information in nonstandard formats that pre-existing content cannot understand.

Of course, the system may also be configured to allow for manufacturers to add additional proprietary functions for use by content producers who choose to use them. The ability to add new functions is particularly valuable for manufacturers who wish to add new features to their products, since they can add these features, then establish co-operative business relationships with content publishers to support the features. Such an embodiment can be extended easily while (if desired) maintaining backward compatibility.

Manufacturers are responsible for providing accurate information to the content. While the content generally cannot directly verify the accuracy of much of the information it receives, this is not strictly necessary where manufacturers have strong incentives to ensure that this information is correct. For example, publishers could prevent their future content from playing on products made by dishonest manufacturers.

Although it can be beneficial if players provide cryptographic authentication of information they provide to the content (e.g., by including digital signatures issued using certified player or manufacturer keys), such authentication is not mandatory for most data. For output devices (such as digital speakers requesting high-quality digital audio data) or other portions of the system that connect via potentially untrusted interfaces, cryptographic authentication is more important so that malicious devices that impersonate trustworthy devices can be detected and avoided.

Cryptographic Processing

In addition to providing information describing the playback environment, an exemplary player also implements cryptographic operations that can be invoked by the content.

These operations can behave like cryptographic oracles, allowing the content to supply an input datum (for example, a 64-bit plaintext block) and returning the result of a cryptographic computation. In an exemplary embodiment, the inputs to the cryptographic computation include at least a key (whose value is normally unknown and inaccessible to the content) and the content-specified input datum.

The following are (without limitation) examples of cryptographic primitives that can be provided to the content for uses including (without limitation) authenticating the playback environment, deriving content decryption keys, etc.:

Block cipher oracles: The oracle encrypts (or decrypts) an input message using a secret key, producing a ciphertext (or plaintext) result.

Hash function oracles: The input message is hashed, typically with a secret key (for example using an algorithm such as HMAC-SHA), to produce the result.

Digital signature oracles: The input message is digitally signed using the secret (private) key to produce the result. The function can also provide the public key and its certificate(s) to the content.

Random number generators: Random number generators can provide the content with unpredictable information, for example to use in preventing replay attacks in on-line connections.

Mathematical functions: Basic mathematical operations can be provided to help the content optimize its computation processes. For example, optimized modular multiplication or exponentiation functions can be used by the content to perform the RSA algorithm of U.S. Pat. No. 4,405,829 to Rivest et al. to produce and verify digital signatures and to encrypt and decrypt messages.

Optimized cryptographic primitives: Optimized implementations of standard cryptographic algorithms can help improve performance. These operations can be used to help decrypt or hash blocks of data, including without limitation regions of the interpreter code space or sectors of content loaded from media.

Decryption control: If the content decides that playback is authorized, the interpreter code can initialize the content decryption module with the correct decryption key for each segment of content. In addition, the interpreter code can specify portions of the content that should be rendered or skipped (e.g., to allow real-time watermark insertion during playback). To ensure synchronization between the interpreter and content streaming from media, key changes (or skipped regions) can be specified in advance then triggered by signals in the content. For example, an exemplary embodiment could allow the content to specify a 64-bit value that triggers a key change when encountered in the ciphertext, the number of ciphertext bytes to skip following a key change, and the new key value to use.

Key management: These functions allow the content to determine which keys are known to the player.

In an exemplary embodiment for cryptographic oracles whose operations do not incorporate random parameters or other such variable data, the system can be configured so that expected result for a particular input can be computed in advance (e.g., when the content is mastered). The publisher can thus program the content to submit a chosen input to the oracle, then verify that the expected result is obtained. Malicious players that lack authorized cryptographic keys will be unable to compute the correct oracle response. Because the number of possible oracle inputs is enormous (e.g., $2^{128}$ for an oracle using a block cipher with a block size of 128 bits), it is not practically feasible for an attacker to precompute or store the results to all possible queries.

In addition to validating valid players, cryptographic oracles can also be used to identify invalid players. For example, if keys extracted from a legitimate player are being used for unauthorized purposes, content can be mastered so that it will refuse to play on players that contain the revoked oracles. Because content will not play without valid keys, unauthorized players must include stolen keys. However, by using these stolen keys, unauthorized devices reveal their status to new content that is aware of the compromise.

A wide variety of methods can be employed for incorporating oracle results or checking whether a particular oracle query response is valid. The simplest is to simply perform a comparison against an expected value. Because this can (at least in theory) be circumvented by a maliciously-designed interpreter that behaves as though all comparisons match, content can include "dummy" comparisons that are expected to fail or other such tests designed to thwart malicious interpreters. The oracle itself can also be used to decrypt code or influence self-modifying code. For example, the input to the oracle can be an encrypted version of the desired code. Depending on their configuration, such oracles thus allow content publishers to include on media code that can only be decrypted by authorized players or a subset of players, thereby helping to keep the content's code away from potential attackers. Another way to use oracles is to use their outputs as cryptographic keys or to derive keys. These keys can then, for example, be used to decrypt code, content, other keys, or any other data. This flexible decryption capability can be used to implement a wide variety of protocols and policies in content. For example, if players have an adequate assortment of keys, content can be programmed to use schemes such as the method of Fiat and Naor (see A. Fiat and M. Naor, "Broadcast Encryption," *Advances in Cryptology*, Douglas Stinson, editor, p. 480; Springer Verlag, 1993.). Even sophisticated access control systems, such as those described in U.S. Pat. No. 5,982,891 to Ginter et al. can be implemented if desired (provided, of course, that the player provides the necessary user interface, network, data storage, and cryptographic functions).

For mastering content, publishers may benefit from having access to oracle input/output pairs. In the case where the oracle uses a private key for an asymmetric cryptosystem such as RSA, the publisher simply obtains the public key and uses it to perform the inverse of the oracle operation. For a symmetric oracle constructed using block cipher, player manufacturers can compute for publishers inverses of the symmetric oracles provided in each player. For example, if the player oracle uses a block cipher to decrypt 256-bit data blocks under a secret key, the manufacturer can provide publishers with access to the corresponding encryption function. Because access to the inverse-oracle does not allow the oracle to be compromised, manufacturers could (for example) provide the inverse-oracle computation via a publicly-accessible web server using SSL. Manufacturers could also provide publishers with outputs from randomly-selected oracle inputs. (Although manufacturers could provide publishes with actual oracle functions as implemented in players, these functions could potentially be misused to construct unauthorized players that emulate of legitimate ones.)

The specific methods used to assign keys to players and manufacturers depends on the specific embodiment and security objectives. For example, in one exemplary embodiment, players are assigned a variety of symmetric cryptographic oracle keys, including (without limitation): player symmetric keys chosen (pseudo)randomly from a larger global pool of such keys; player-specific symmetric keys generated (pseudo)randomly by the manufacturer; symmetric keys unique to the manufacturer, player model, etc.; and/or symmetric keys authenticating that the player does not have particular characteristics (e.g., was not produced by particular manufacturers). In this exemplary embodiment, the content can identify which keys are implemented in the player by calling a separate function that returns a list of the supported keys. Players can also contain asymmetric keys. For example, in the exemplary embodiment, players have a player-specific public/private keypair; a player certificate issued by the manufacturer by signing the player public key using the manufacturer's private key; a certificate issued by a root key issuing authority validating the manufacturer's public key; a public key used to validate requests to access the player's secure memory areas (see below); and/or a public key used to validate player firmware updates.

In infrastructures involving multiple player manufacturers, it may be helpful to have one or more central administrative organizations manage keys for players, manufacturers, etc. Central administrators can also be helpful for enforcing minimum security standards, ensuring that players provide accurate information to content code, reserving keys for new manufacturers (so that that their products will be able to play old content), tracking compromised keys, performing cryptographic oracle operations for content publishers, etc.

Secure Memories and Counters

The memory available to content is typically volatile, providing content with a "clean" execution environment each time it is run. For some features, however, it is useful for content to be able to store data between playings and between titles. To satisfy this need, players can provide content with secure, nonvolatile storage for maintaining state between playings. Such storage can require additional security protections to ensure that only authorized interpreted code is able to read or modify the nonvolatile memory contents. Ensuring the security of nonvolatile memory is important for publishers so that, for example, this memory can be trusted to track offline pay-per-view viewing histories for later billing. It is not adequate to simply have a key on the media for unlocking each memory slot, since this key would soon be discovered by pirates, compromising the memory slots of all players. Thus, one embodiment provides for explicit cryptographic authentication of the code that accesses these secure nonvolatile memory regions.

In this embodiment, players contain several blocks of nonvolatile memory, which are locked (i.e., read and write permissions are denied) by default. The player also contains a public key used to authenticate requests to unlock memory blocks. To gain access to this memory block, the content calls a function that takes as input a digital signature over the block of code that is authorized to access the memory. This signature is verifiable using the public key embedded in the player and specifies the memory block to unlock and the access privileges authorized (arbitrary read, arbitrary write, increment, decrement, zeroize, etc.) within each portion of the block. The interpreter verifies the digital signature and, if the signature is valid, unlocks the memory and executes the digitally-signed code. The following shows an example of this process for use in billing for off-line pay-per-use content with occasional (e.g., monthly) auditing:

(a) Publisher X negotiates with player manufacturer Y rights to control a 4-byte counter in the nonvolatile memory of manufacturer Y's players.
(b) Publisher X writes a function for the interpreter that checks the memory contents. If the value is below a spending limit, the function increments the counter. Otherwise, the function establishes an Internet connection with the publisher, transmits a payment request including the counter value, a random number, and payment information (such as a credit card number or other funding source stored in the player). If the publisher accepts payment for the past purchases indicated by the counter plus the current purchase, the publisher transmits to the player a cryptographic authorization to clear the counter, which the player verifies and (if valid) zeroes the counter. The player concludes by relocking the memory and returning a code indicating success or failure.
(c) Manufacturer Y digitally signs the memory-update code with parameters identifying Publisher X's memory regions, access privileges, etc.
(d) Publisher X produces content including the signed code and distributes it to a user.
(e) The user's player begins loading the content, which presents the user with a purchase option. If the user declines to purchase, playback does not proceed.
(f) The content calls the memory unlock function with pointers to the code written at step (b), and the digital signature produced at step (c).
(g) The memory unlock function attempts to perform the purchase as described in step (b) and reports success or failure.
(h) If the purchase was successful, the content plays for the user. Otherwise, playback terminates.

Of course, much more sophisticated purchase mechanisms can be employed using the secure counter mechanism described above. The only real limits on what can be implemented in the content come from the player's capabilities and the publisher's creativity.

Various storage technologies can be employed with the systems and techniques disclosed herein, including without limitation, flash memory, magnetic storage (e.g., hard disks), battery-backed RAM, etc. (A wide variety of methods are known in the background art for providing nonvolatile storage and for encrypting or otherwise securing such storage.) Secure storage can (without limitation) be located outside of the player, including without limitation in a removable module (such as a smart card), in attached output peripherals (such as speakers, displays, remote devices in a home network, etc.), remotely over a computer network, etc. Memory block assignment can be provided, for example, on a space-available basis, guaranteed (e.g., by slot number), or allocated/recycled based on priority. Because the clearing or freeing of memory slots could result in the loss of unreported pay-per-view records, content can be given the ability to specify the conditions under which slots can be over-written. For players that can play multiple titles simultaneously but that have only one set nonvolatile memory slots, a locking mechanism may be required to ensure that one piece of content will access a slot that is being modified by another piece of content.

In one embodiment, a pre-paid smart card is purchased by a consumer and inserted into a slot on the player. The card contains a plurality of write-once memory slots into which the player can write identifiers corresponding to pay-per-view content titles. Once written, the content identifiers are incorporated into cryptographic oracle computations implemented in the card. Thus, content can verify that a purchase has been consummated by verifying that the correct oracle is present before allowing playback.

Note that the general approach described above for authenticating calls to player functions is not limited to use with secure counters. For example, the same approach can be used to secure access to special player features only available to authorized publishers. The approach also has applicability separate from other aspects of the techniques and systems disclosed herein, as it provides a general-purpose but extremely flexible method for securing access to computation functions.

Cryptographic vs. Language Based Security Features

Security policies can be enforced in several different ways. Cryptographic protections allow the construction of content such that revoked or unauthorized players will lack the cryptographic keys necessary to decrypt the content. Unauthorized players cannot access content which they lack keys (provided, of course, that good ciphers are used). This approach is relatively inflexible since it provides the content owner with only the ability to block playback on a particular device. (While a more sophisticated embodiment could use different key sets to offer somewhat more detailed control, key-based controls lack the flexibility required to solve more complex access control challenges.) Nevertheless, it is extremely effective at addressing the case where a particular player is compromised or otherwise deemed untrustworthy to have the ability to decrypt the content.

In contrast, language-based controls are less effective in the case where a player is compromised (or totally untrusted for some other reason), but can enforce extremely sophisticated security policies. As noted previously, the content can analyze the playback environment and call to cryptographic oracles and, if the results are deemed unsatisfactory, refuse to play. This approach provides virtually unlimited flexibility, making it ideally suited to managing risks involved in playback on players that generally behave honestly but may support operations (such as ripping to unprotected formats) that some publishers may wish to prevent on certain content. Although attackers could, at least in theory, analyze and break individual pieces of content (particularly if the content's code is poorly-written), these attacks cannot be generalized and can be reliably addressed through careful use of the cryptographic oracles. Furthermore, the decryption control capabilities described herein enable publishers who observe pirated copies of their content to identify the compromised device and produce new content that it is not vulnerable.

Evolution

It is desirable to provide content owners with a distribution infrastructure that remains secure over the long term. Previous content protection systems have failed terribly in this regard; while implementers may initially be diligent about security as they woo content owners to a new format, security levels tend to fall significantly once a format's success is ensured. A variety of factors contribute to this decline, including: availability of more implementations to attack (increasing the likelihood that an easily-broken product will be sold), increased demand for piracy as more protected content becomes available, and increased sophistication of attackers. Exemplary embodiments of the systems and techniques disclosed herein can be configured to allow content owners to continue to specify how their content will be protected even after a media format has been standardized, while allowing virtually unlimited renewability so that security is not lost forever if an attack is found.

If security policies are not static, manufacturers have an ongoing long-term incentive to provide effective security. For example, content owners can have the ability to block playback (or prevent high-quality playback) on devices whose keys are compromised or on products that are commonly used for piracy. As a result, unlike traditional systems, product manufacturers cannot sacrifice security as they compete to offer their products at the lowest possible price, since consumers will also seek out products that have robust security because these will offer the best and most reliable playback experience.

Even a well-intentioned manufacturer may accidentally produce a product that is later found to have security flaws. Accordingly, we disclose a variety of methods that can be used to respond to compromises and security weaknesses. For example, player cryptographic keys and software can be updated using digitally-signed code or key updates. These updates can be delivered to the player on media containing software that performs the key update. For example, if a legitimate user's player ends up being revoked because a previous owner compromised its security, the new owner can call the product's technical support line and obtain new keys. (Of course, the customer service personnel may wish to obtain some user information such as name, address, credit card number, telephone number, e-mail address, IP address, etc. to discourage pirates from calling to request new keys for unauthorized purposes.) Updates can also be distributed via the Internet (or other network connections), modem calls, entry via the remote control or keyboard, etc. Of course, updates should be cryptographically secured whenever possible so that attackers cannot use the update process to inject compromised keys or otherwise attack a player.

Another way that manufacturers can reduce the consequences of a compromise is to include a removable security module, such as a smart card. The smart card would implement some or all of the cryptographic oracles as well as other security-related functions provided to the content. If a compromise does occur or if a security flaws is found, it is possible to replace the smart card instead of replacing or upgrading the entire player. Note that it may be sufficient to simply provide a smart card slot, but not deploy smart cards until such time as it becomes necessary for security reasons. To prevent smart cards from being removed from legitimate players and used in malicious ones, the smart card can be cryptographically linked to the receiver (e.g., by having them share a symmetric key) before the player and/or card are sent to the consumer.

Mastering & DRMs

Any new costs involved in mastering content are a legitimate concern for content owners. The techniques and systems disclosed herein can be deployed so as to avoid significant new costs to the mastering process, if simple security measures are employed. While developing content that enforces complex security policies obviously requires more development and testing effort, this expenditure is entirely optional. (Other protection systems simply eliminate this choice, forcing all content publishers to use the same security systems, policies, etc.)

Of course, publishers do not need to develop security systems themselves since the systems and techniques disclosed herein also permit third party DRM vendors to provide security modules and mastering systems. These vendors would compete for publishers' business by offering the best features, best security, lowest cost, greatest flexibility, best ease of use, best performance, smallest code size, most extensive revocation lists, etc. The techniques and systems disclosed herein can serve as a platform where content owners have the ability to make their own decisions about security.

Watermarking & Compromise Tracing

With most conventional watermarking methods, the mark detection process is standardized and implemented in a large number of widely deployed products. This static algorithm unfortunately poses a serious risk, since knowledge of the detection algorithm generally allows attackers to remove the watermark without seriously degrading the content. In an exemplary embodiment, the systems and techniques disclosed herein may include on-the-fly watermark insertion that is not susceptible to a general mark removal attack because the mark format, encoding process, and detection process are all chosen by the publisher.

In one exemplary embodiment, a publisher (or, more precisely, a control program written by the publisher) wishes to embed some information in some output content. Each bit of this information can be encoded by decrypting and outputting either a first content portion or a second portion. These portions can be different encrypted regions on the media and can be encrypted with different keys. The differences between these portions can be chosen by the publisher when the content is mastered, and can be anything from imperceptibly-subtle variations to total dissimilarity. Because there is no predetermined relationship between the two portions, there is no way for a pirate who knows only one portion (including the decryption key for that portion) to determine the other.

Because cryptographic and program-based controls can be used to select which regions are decrypted, attackers cannot determine what the alternate region(s) contain. Indeed, content can be designed so that attackers cannot even identify whether alternate regions are present, for example by encrypting the control code (so that different players use different code) and by including dummy regions that no players or only a very small number of players can decrypt.

In one exemplary embodiment, content is authored so that only a subset of all players have the keys necessary to decrypt each version of a region of the content, yet substantially all players have the keys necessary to decrypt at least one version of the region. Thus, by analyzing an unauthorized copy of this region, the publisher can determine information about the attacker. Note that this is true even in the case where attackers manage to analyze a (vulnerable) program and decrypt more than one alternate region, since the resulting combination of several regions still reveals to the publisher which versions were decrypted. Ultimately, the only way reliable way that users can avoid revealing their identity (or their player's identity) to publishers' anti-piracy enforcement experts is to refrain from participating in piracy in the first place.

This general marking approach is different from conventional watermarking because the mark detection process need not be standardized. This difference allows vastly greater security; indeed, it can be shown that there is no general attack against this marking scheme. Furthermore, because the watermarked bits produce differences in the output, these watermarks can be extremely robust and can be designed survive digital/analog conversions, editing, format conversions, malicious attacks, etc.

The decision of how to configure and use the content marking capability is typically made by the publisher. Some artists may wish to avoid to any technology that could make any modification, however small, precluding the use of the watermarking feature on their work. In other cases, certain types of content are pirated widely and are good candidates for very aggressive use of marking capabilities. While portions would normally be chosen to have only imperceptible differences, the choice of what alternate versions to encode, how to select between possible output versions, and the management of the decryption keys for these portions is controlled by the content. Because the marking capability is controlled by data processing instructions integrated with the content, the technology can be used for other features including, without limitation, implementing a sweepstakes where winners' players output a congratulatory message, delivering of security alerts to users whose players offer inadequate security, and providing bonus content to certain users.

Of course, other watermarking schemes can also be used with the techniques and systems disclosed herein. For example, traditional watermarks (for which the mark detection algorithm is standardized) can be embedded in output as well, either by the content's code or by external watermark embedding circuitry (which may or may not be under the control of the content). Similarly, watermarks in incoming content can be sensed (again, either by the content's code or by external detectors), for example to detect attempts to make unauthorized copies or introduce unauthorized content. The choice of what watermarks to embed and how to respond to detected watermarks can be implemented in the player and/or in the content.

Example Migration Path: CD-Audio

The vast majority of digital content is distributed today in unprotected or minimally-protected formats. For example, the CD audio standards contain no anti-copying features, and the protection scheme in DVD video has been widely broken.

Because legacy media players do not support adequate security, they need to be upgraded or replaced. The success of a new security system depends on establishing a critical mass of compatible players.

By combining the techniques and systems disclosed herein with existing methods for producing copy protected CDs, it is possible to produce CDs that are backward compatible. Such CDs would utilize non-standard CD formatting to produce discs that play correctly on most audio CD players but confuse computer-based ripping software. Authorized (e.g., licensed) personal computer software can also play the disc by correcting the portions that are read incorrectly or otherwise confuse the computer. Thus, playback is enabled on (most) legacy audio players because they can play the non-standard (copy protected) Red Book audio portion, and playback is enabled on personal computers that have appropriate player software (which can, for example, be included on the CD or can be downloaded over the Internet). Although long-term support for backward-compatibility with existing CD audio players can introduce additional security risks, it can be beneficial as part of a longer-term strategy to encourage the deployment of audio players that can play the new secure format so that (eventually) content can be sold in only the secure format.

Example: High-Definition DVD

The copy protection system employed by current DVD video players has been widely broken. Because millions of DVD players have already been sold and are not upgradeable to new protection systems, there is no straightforward way to upgrade the current DVD format without abandoning support for these legacy users. Fortunately, the installed base of DVD players are only designed to support "standard" definition television (e.g., 525-lines for NTSC, 625 lines for PAL, etc.), but not the much higher-quality signals provided by high-definition television (HDTV) formats. Because legacy players do not support HDTV, the new security features disclosed herein can be incorporated on DVDs that support HDTV.

In one exemplary embodiment, the player would have a user-accessible media input (consisting of a mechanized tray for one or more discs), which loads the media to a spindle where it is rotated and read using a laser. The data read from the media are brought to a microprocessor-based circuit, which analyzes the disc encoding to determine the capacity of the disc, formatting type, and security method. If the disc is a legacy (low-resolution) DVD using the legacy security scheme (CSS), then the disc is played using methods known in the background art. If the disc is a high-density DVD using programmable security methods as disclosed herein, then program code (data processing instructions) for the content's security policies are loaded from the disc and executed by the player. Players can optionally also support low-density DVDs using the improved security, as well as high-density DVDs using legacy protection methods (although using a widely-broken security scheme for new content generally provides little benefit). The quality of the output from the DVD player can be controlled by the content. For example, the content can elect to output lower-resolution output if the player and/or HDTV output device do not provide adequate security. In this case, the content can (for example and without limitation) direct the player to down-convert HDTV signals to lower resolution (for example, using a degradation module specifically designed for this purpose), supply the player with only the keys required to decrypt lower-resolution portions of the signal (and withhold keys required for the higher-resolution portions), or direct the player to output a low-resolution version of the content that is encoded on the media separately from the higher-resolution version.

Interpreter Architecture

In one exemplary embodiment, the interpreted language is based on the DLX assembly language. The basic DLX processor architecture is well known in the background art (e.g., see *Computer Architecture: A Quantitative Approach* by Hennessy et al., Second Edition). Code executing within the interpreter's memory space (which, in one exemplary embodiment, consists of 8 megabytes of RAM) is sandboxed such that it can only access this memory and the processor's register set. Invalid instructions (or other operations) may be treated as NOPs (i.e., do nothing) or may trigger an exception. Similarly, out-of-bounds memory accesses may trigger an exception or may be corrected (e.g., in the case of a 32-bit read from an 8 megabyte address space, by ANDing the address with hexadecimal 0x007FFFFC to wrap out-of-bounds accesses around to the beginning of memory and to ensure 32-bit alignment).

The DLX "trap" instruction is used to provide access to external procedure calls. The "trap" instruction invokes operations in the player that may extend outside the sandbox (i.e., beyond the registers and memory accessible to normal instructions). For descriptions of such operations, see the section "Querying and Controlling the Playback Environment".

It is also possible for a dedicated hardware embodiment to use an ASIC or FPGA (or other hardware) implementation of the DLX processor instead of a software-based interpreter/emulator, in which case the "trap" instruction may (for example) be configured to trigger the processor to enter a higher privilege level, expand its address space to include a ROM or EEPROM area (e.g., by enabling an additional address line), store the return program counter, and jump to a predetermined address in the expanded address space for further processing. The higher privilege level may also enable additional instructions or capabilities in the processor core, such as the ability to interact with external peripherals (e.g., nonvolatile memory, cryptographic accelerators, key management components, optical media drives, data networks, satellite receivers, etc.) Memory protection capabilities in hardware implementations can include limiting the number of address lines (thereby preventing out-of-bounds accesses), or using other memory protection methods known in the background art. Upon completion of the "trap" call, the processor would reduce the privilege level and continue execution of the content code.

In an exemplary DLX implementation for decrypting video distributed on high-density optical discs, a "trap" operation is provided to allow the content to read data from the disc. To load data from physical media, the content code typically specifies an address (e.g., a sector number on an optical disc), the destination address for the data in DLX memory space, the amount of data to load, and optionally decoding parameters (such as error correction polynomials/parameters, decoding keys, etc.). The content may perform any manner of processing steps using the data, even including executing the data as code. Because optical drives, hard drives, and other data sources often have considerable latency (especially when performing operations such as seeking to a new track), separate "trap" operations may be used to pre-specify regions that are expected to be needed, to request data, to check the status of pending requests, and/or to actually load data into the DLX memory space.

The content code can also invoke trap operations for performing high-speed cryptographic operations on memory. For example, an exemplary bulk decryption "trap" operation utilizes the AES encryption algorithm and allows the content to specify (a) an index selecting from among the secret keys stored within (or accessible to) the player, (b) to an encrypted key, (c) an address in the DLX memory space for the data to decrypt, and (d) the length of the data to decrypt. The trap (a) uses the key identified by the index value to decrypt the encrypted key received from the content, and (b) uses the decrypted key with the AES algorithm in ECB mode to decrypt the specified number of data blocks at the address indicated. The key-decrypting-keys that may be selected by the index may include keys stored in the player (including without limitation player-specific keys, manufacturer keys, group keys, media keys, etc. which may optionally be stored in internal tamper-resistant chips with cryptographic capabilities and internal nonvolatile memory), keys stored in external devices (including without limitation cryptographic modules, disc drives, remote network-accessible devices/servers, displays, speakers, etc.). To determine what keys are available, the content code may analyze information such as the player's type, the player's serial number, key lists/descriptions included with the player (and optionally digitally-signed by the player manufacturer or a trusted party), data obtained over a network, and any other available data about the player or playback environment (see the section "Querying and Controlling the Playback Environment"). Any manner of other cryptographic capabilities may also be provided by the content to the player, including without limitation: encryption, decryption, symmetric algorithms (stream ciphers, block ciphers, hashing algorithms, message authentication codes, etc. with any modes of operation), public key algorithms (signing, verification, encryption, decryption, key agreement, zero knowledge operations, etc.), key and certificate management, etc.

The content code may perform additional processing (or preprocessing) operations on the decryption result. For example, an XOR operation might be performed to convert an ECB decryption result into a CBC decryption result. Descrambling steps may be applied to prevent adversaries from using keys extracted from players to decrypt content without executing its interpreted code. Examples of steps that may be applied include, without limitation, toggling bits, making changes using simple binary operations, reordering blocks, fixing up or inserting offsets/addresses (e.g., to assemble a data stream that is complaint with MPEG-2 or other video compression standards), applying public key operations (such as modular squaring or cubing modulo a composite number), applying symmetric cryptographic operations, and updating internal checksums. Post-processing steps can also be used to introduce or modify forensic watermarks, e.g. to allow copies to be traced to a specific device. Decoded/processed data may also be executed using the interpreter, allowing portions of the decryption/playback code itself to be distributed in encrypted form and enabling content to utilize a wide variety of code hiding and obfuscation techniques, such as the use of self-modifying code. It is even possible to construct multi-functional data, e.g. data that performs a useful task when executed but also represents valid compressed video.

When the processing is complete and data is ready to be output, the content code can invoke additional procedure calls (e.g., DLX "trap" operations) in the player for outputting data to the user. Such calls may, for example, transfer data to one or more video decoders (e.g., an MPEG-2 decoder), audio decoders (e.g., an MP3 or AC-3 decoder), or graphics overlay systems (e.g., with transparency/overlay capabilities and supporting still images and/or animation engines such as GL, ShockWave, or Flash). The data would be transformed (e.g., decompressed) if appropriate, then presented. Presentation may include transferring the data to one or more physically-separate device, such as audio speakers or video displays.

Embodiments with decryption and decompression/output as separate API calls have the advantage that they allow greater control by the content, but have the potential disadvantage of increasing the number of times that the content needs to be read from and written to memory. In practice, however, random access memory is usually sufficiently fast that the additional latency is manageable even for very high bit-rate content such as theater-quality high-definition video. On high speed implementations, player codecs may be unnecessary, as decompression may be implemented in interpreted code. Players can also provide single-instruction, multiple-data parallel processing capabilities (e.g., by offering single-instruction-multiple-data mathematical operations accessible via procedure calls, roughly similar to the MMX, SSE, and SSE2 instructions found on x86 processors) to improve the performance of codecs, graphics processing operations, etc. implemented using interpreted code.

A variety of interpreter implementations strategies are possible. In one embodiment, an interpreter is implemented in software that runs on a normal microprocessor. In another embodiment, an interpreter is implemented using reconfigurable logic, such as a field programmable gate array. In another embodiment, a dedicated hardware device performs the role of the interpreter. In all three cases, procedure calls may be implemented (without limitation) using any combination of native software, hardware acceleration, and calls to external devices or components.

Native Code

In addition to interpreting player-independent, sandboxed code, the player may also allow the content to submit native code for execution and/or storage. Prior to accepting software or logic that may have access to keys or other privileged resources, the player validates the code. Validation may, for example, be performed by making sure that the code includes a valid RSA digital signature issued by the player manufacturer or another trustworthy party. Successfully-validated native code may be stored in volatile memory for execution by the currently-loaded content, or it may be stored in the player's nonvolatile memory where it can be available to other titles. For example, to avoid possible negative effects on other titles, a patch to correct a cosmetic quirk in the player or to provide a performance optimization might be stored in volatile memory for use only by the currently-loaded title. In contrast, an upgrade to correct a security vulnerability would typically be stored permanently in the player's nonvolatile memory.

Native code is normally specific to a single player platform or player application, making it less portable than interpreted code. Its advantage is that it can be used if needs arise that cannot be addressed using interpreted code. For example, native code can be employed by content as a way to distinguish between legitimate players and unauthorized emulators or "clones", avoiding the need to revoke every potentially-affected device each time attackers find a major security vulnerability in a product's design. As a defense against such attacks, product vendors can include built-in native-code capabilities or interpreter operations that would be difficult to emulate or reverse engineer. Note that capabilities designed to help detect or respond to player-specific attacks can be vendor-proprietary and/or player-specific, since they would only be activated in response to a player-specific issue. Specific measures could include, without limitation, simple undocumented features, timing-sensitive routines, operations that are explicitly designed to be difficult to reverse engineer or emulate at full speed in software (e.g., see the Pseudoasymmetric Function of U.S. Pat. No. 6,289,455 to Kocher et al. which is hereby incorporated by reference in its entirety), and full cryptographic oracles (symmetric or asymmetric). In the case of a device where the interpreter is implemented in dedicated hardware, the "native" code and the interpreted code may be similar or identical (though they may operate with different privileges, in which case players could limit execution at the higher privilege level to specially-authenticated code).

In an exemplary embodiment of content employing native code, the media includes an initial boot portion consisting of interpreted code which, when interpreted, loads additional interpretable code. The content code (e.g., the code loaded by the boot portion) would then issue procedure calls to the player and analyze the results to determine information about the playback environment, including the player type. The content may also verify the playback environment, e.g. by requiring that the player (or other components) perform cryptographic operations using keys specific to (or characteristic of) reported playback environment characteristics. To deter malicious interpreters from tampering with the validation results, the result of such operations may be used in subsequent decoding and playback processes. (For example, by incorporating cryptographic results from the player in decryption key computations, content can robustly prevent playback on malicious players that claim a particular player type or playback environment attribute but lack the corresponding cryptographic keys. Results can also be compared with expected values, verified using public key schemes, etc.) The content then determines whether the player is of a type that, by default, includes a security defect (or other problem) that needs correcting. In making this determination, the content code may analyze information from within the player (e.g., data in nonvolatile memory accessible to the content, date/time information from a clock in the player, etc.) and/or information obtained externally (e.g., by querying attached devices or communicating over a network). If a problem is identified, a corresponding countermeasure is obtained (e.g., from the media or over a data network such as the Internet). Depending on the nature of the issue, the countermeasure may involve interpreted code and/or native code. In the case where a native code countermeasure is necessary, the content can submit the countermeasure code as digitally-signed data to the player, including instructions indicating whether the code should be buffered in volatile memory for future use (e.g., through a procedure call), stored permanently (e.g., to correct a bug in existing nonvolatile memory), and/or executed immediately. The native code can also be configured to perform an identifiable operation (such as a cryptographic computation that can be integrated with content decryption processes) so that content code can be assured that the native code was actually executed by the player. Native code can also be configured to disable malicious players, e.g. by overwriting cryptographic keys. The content may also query, analyze, and deliver code and code updates (native or interpreted) to other devices, such as displays or speakers connected via digital interfaces. Once the playback environment is acceptable, the content code then proceeds with playback as requested by the user, for example by loading chunks of data from the media, performing decryption operations while inserting forensic watermarks, and delivering the decrypted data for decompression and output.

Standardization and Performance Considerations

It is often necessary to have standards that define the playback environment in sufficient detail that makers of compliant players can be confident that their products will be able to play compliant content (subject to security policies, etc.). Such standards would typically specify the interpreter's basic instruction set (or equivalent) and required procedure calls. It may also be necessary to define performance requirements for any instructions and procedure calls that may be included in real-time portions of the decoding process. (Performance requirements are generally less critical for operations that are only performed during start-up, shut-down, and other non-real-time operations.)

For example, an exemplary specification might require that compliant interpreters be able to execute a minimum of 8 million "time units" (TUs) per second, where normal low-level interpreter operations may each take up to one TU and multiplication and division operations may take 4 TUs each. Performance requirements for calls to player-supplied procedures (e.g., DLX "traps") depend on the operation requested. For example, AES encryption operations may take up to 100 TUs plus 12 TUs per block cipher computation. Word-aligned memory copies may take up to 50 TUs plus 1 TU per 16 bytes (or fraction thereof). Buffering a media read request, or checking the completion status of a buffered request, can take up to 100 TUs. Read requests are performed one at a time in the order submitted but in parallel with other processing, and may take up to 10,000 TUs plus 1500 TUs per 2048-byte sector. Non-sequential reads may take an additional (20000+ 640000*seek_distance_in_sectors/max_sectors_per_media) TUs for seek overhead. Loading data from a completed read (i.e., transferring data from the drive's buffer into the interpreter's memory space) can take up to 100 TUs plus 128 TUs per 2048-byte sector transferred. Transferring data to codecs or other outputs can take up to 100 TUs plus 1 TU per 16 bytes (of fraction thereof) transferred. Of course, these timing values are provided for exemplary purposes; the specific performance metrics would depend on the system's requirements. More complex performance mandates (e.g., that specify total computation times for instruction sequences) may also be specified to provide player implementers with greater flexibility or to provide content authors with better performance guarantees.

In practice, many implementations would operate considerably faster than the performance minimums. This simply means that the data will be ready before it is required. For example, a software-based interpreter that takes 40 clock cycles per regular interpreted instruction would perform about 50 million TUs/second on a 2 GHz microprocessor. Similarly, a dedicated hardware implementation running at 25 MHz and running at 2 clock cycles per instruction would also perform significantly more than 8 million TUs per second.

Note that standards developers face a trade-off between simplicity of the system and the performance. In particular, for software-based implementations, operations performed in procedure calls can generally be assumed to operate significantly faster than the same operations in interpreted code. On the other hand, these operations must typically be defined in advance and also typically include entry/exit overhead in their performance assumptions. Nevertheless, procedure calls for common operations such as memory copying, searching, large-number arithmetic, and cryptographic computations can provide a significant performance benefit. An alternative performance-enhancing approach is for the interpreter to analyze the content code before or during execution to identify regions that can be optimized (e.g., converted into native code). The content code can also include "hints" to notify the interpreter of regions that are suitable candidates for optimization. The "hint" approach has the benefit that hardware implementations (which tend to be fast, but have difficulty performing complex operations) can ignore the hint (e.g., by treating it as a NOP) and process the subsequent code normally. Software implementations (which tend to be slower, but have higher-speed native code capabilities) can use the hint to substitute interpreted code with functionally-compatible native code routines. If desired, performance standards can specify player performance requirements for common constructions. Players can also allow content to select between interpreter modes that are always guaranteed to meet performance minimums (e.g., for real-time tasks) and modes with better average-case performance (e.g., for non-real-time tasks).

When authoring content, content developers need to verify that the software they have written meets the performance minimums specified by the standard. A specialized test system for verifying timing compliance tabulates the worst-case performance characteristics of content code as it executes. It operates by emulating the playback process, while tabulating the maximum allowable time a player could take for each suboperation performed. If the playback process is too slow (e.g., if the measured worst-case player performance lags behind timestamps in the data being supplied to the codec or if the codec could become "starved" of data), the tool can notify the media author, who can then correct the problem. Authoring tools may employ the same approach to ensure that their output will play reliably.

Securing Nonvolatile Memory

As described previously, a player device can provide content with nonvolatile (NV) storage capabilities for use by the content. Because the number of entities authoring content may be large (possibly including small artists, students, home users, etc. as well as major studios), it may be advantageous for content and players to enforce limitations on NV storage use under the assumption that some content may be written poorly or even maliciously. As a result, players may wish to limit the ability of each title to reserve NV memory and to read, modify, and over-write stored data. The section entitled "Secure Memories and Counters" describes using digital signatures to validate code that accesses nonvolatile memory. In some situations, however, it may be desirable (e.g., for political and/or technical reasons) for the nonvolatile memory security to operate without a centralized certification authority while still allowing content titles to allocate and/or control nonvolatile memory regions.

Figure 4:
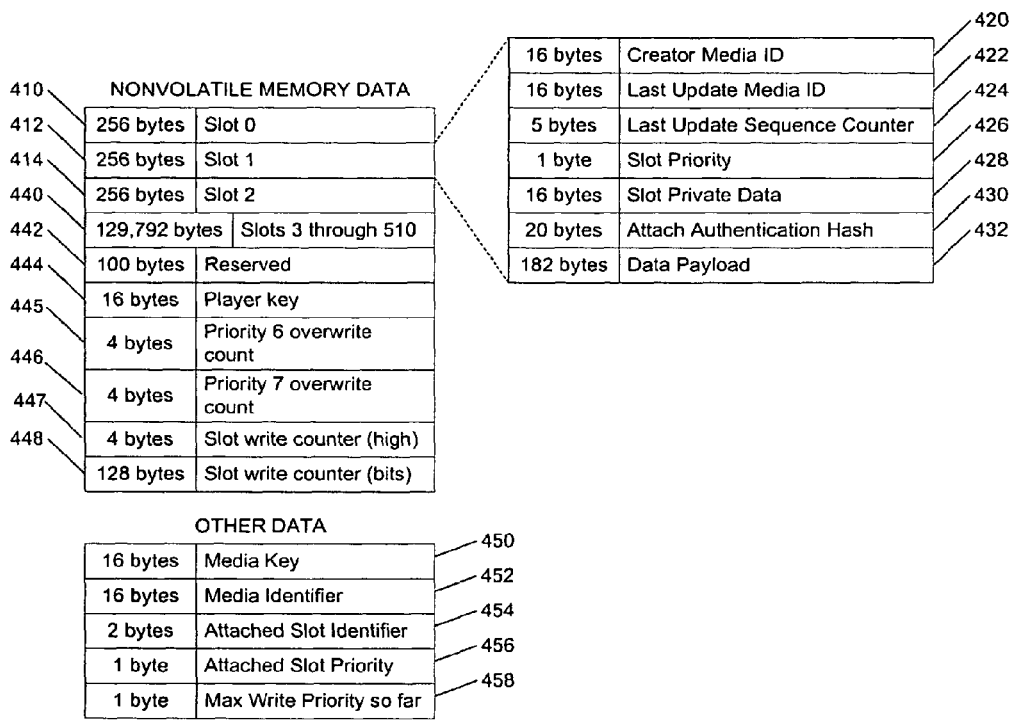
FIG. 4 illustrates an exemplary embodiment of player method for securing access to a nonvolatile memory without requiring a centralized code signing authority.

The following section describes an exemplary embodiment of a player that provides content with secure access to a nonvolatile memory without requiring a centralized signing authority. Referring to FIG. 4, the exemplary memory manager controls access to 128 kilobytes of flash memory, which is divided into 511 slots of 256 bytes each and 256 bytes for additional data. Slot 0 [410], slot 1 [412], slot 2 [414], and each slot thereafter 440 contains: a 128-bit creator media ID 420 identifying the media ID of the title that originally allocated the slot; a 128-bit last update media ID 422 identifying the media ID of the title that most recently modified the slot; a 40-bit last update sequence counter 424 identifying when the slot was most recently updated; an 8-bit slot priority value 426 indicating the slot's rank if a slot needs to be overwritten; 16 bytes of private data 428 that is only accessible by authorized code; a 160-bit hash 430 of the code that is authorized to access the slot; and the main slot payload data 432. When a player is initialized at the factory, these values may be all initialized to zero to indicate that the slot is empty.

The final 256 bytes of the 128 kilobyte nonvolatile memory is used to store values including: a secret player key 444; a counter containing the number of priority 6 slots that have been overwritten 445; a counter containing the number of priority 7 slots that have been overwritten 446; and a slot write counter stored as a high portion 447 and a low portion 448. Because the slot write counter is updated frequently and some nonvolatile memory technologies wear out after too many write cycles, this counter is stored in a form that limits the number of times that any particular memory cell is updated. The counter is incremented by setting a bit in the low portion 448 unless 1023 of the 1024 bits in the low portion are full, in which case high portion 449 is incremented and all 1024 bits of low portion 448 are cleared. The counter value is read by multiplying high portion 447 by 1024 then adding the number of bits set in low portion 449. When a player is initialized at the factory, these values may be all initialized to zero, except that the player key should be initialized with a secret (pseudo) random value.

The player also maintains several values which may be stored in volatile memory (e.g., conventional RAM). These include media key 450, media identifier 452, a value indicating which slot (i.e., number 0 through 510) is currently attached 456, and a value indicating the highest priority slot in the NV memory written so far by the current title. When a title is initialized (e.g., when media is inserted or the player is reset), attached slot identifier 454, attached slot priority 456, and max create priority 458 are reset. Media key 450 is preferably loaded from a portion of the media that is not writable with consumer-recordable devices on consumer-recordable media. Media identifier 452 is then derived from the media key by applying a one-way cryptographic transformation, such as the secure hash algorithm (SHA-1), which is well known in the background art. To provide additional assurance, the media may carry a cryptographic signature authenticating media key 450 and/or media identifier 452, which can then be authenticated by the player and/or content code. Alternate embodiments may include other values (such as the identity of the facility that manufactured or pressed the media and/or identifiers specific to particular piece of media instead) and do not necessarily have to have a fixed relationship between identifiers and keys.

In general, content code can be allowed largely unfettered read access to nonvolatile memory contents, excluding the private data 428 of each slot. This read access may be implemented using procedure call (e.g., a DLX "trap" operation) that allows the content to specify a slot number and retrieve the contents. If the requested slot is not currently attached (i.e., identified by attached slot identifier 454), the slot private data 428 is not returned (e.g., zeroes are returned for these locations).

In the exemplary embodiment, content is provided with the following basic operations for reading from, requesting access ("attaching") to, and modifying nonvolatile memory slots:

ReadSlot: This procedure call reads the contents of a specified slot into the memory space accessible by the content code. This procedure's input parameters include a slot number and a pointer within the content's memory where the results should be stored. The entire slot contents are returned except for private data field 428, which is normally zeroed in the read results. If specified slot number is (−1), the slot identified by attached slot identifier 454 is read and the complete contents (including private data 428) are retrieved and stored. The operation's return value is an integer containing either the slot number that was read (e.g., attached slot identifier 454 if slot (−1) was specified) or an error code indicating why the request failed.

AttachSlot: This procedure call is used to request privileged access to a specified slot. Prior to granting such access, the code making the request is authenticated. The procedure's input parameters identify the slot number, the code length, and a requested priority level. The procedure determines the starting address of the code to be granted access (e.g., the address in the content's memory following the instruction invoking the AttachSlot operation). Using the address and the specified length, the procedure then computes a cryptographic hash (e.g., using SHA-1) of the code. If the hash result does not match the value of the authorization hash 430 stored in the slot or if the requested priority is determined to be invalid (e.g., as described below with respect to FIG. 5), then slot zero is attached (i.e., attached slot identifier 454 and attached slot priority 456 are set to zero) and an error is returned. Otherwise, the requested slot number becomes the slot that is currently attached (i.e., attached slot identifier 454 is set to the requested slot number, and attached slot priority 456 is set). As a special case, the calling code can specify a slot number of (−1) to request that a new slot be allocated. In this case, the player validates the requested priority (e.g. as described below with respect to FIG. 5) and returns an error if the priority is invalid. Otherwise, the player selects a slot to overwrite (as described below), clears it out (e.g., by setting creator media ID 420 to the current media ID 452, zeroing the other slot fields, and incrementing write counter 447/448), attaches to the slot (e.g., by setting attached slot identifier 454 to the slot's number and setting priority 456 to the requested priority), and sets max create priority 458 to the larger its current value and requested priority 456. If the interpreter supports interrupts or other capabilities that could cause the unexpected execution of potentially-untrusted code, these should be disabled to avoid the introduction of malicious code while a slot is attached. The return value is the attached slot number 454, or an error code if the operation failed (e.g., because of a code hash mismatch or an invalid requested priority).

SlotWrite: This procedure call writes data to the currently-attached slot. This procedure's input parameter points to the new contents for the slot private data 428, the authentication hash 430, and the payload 432, which are written along with updated values for other slot fields. (In particular, creator media ID 420 is left unchanged, last update media ID 422 is set to the current media ID 452, last update sequence counter 424 is set to slot write counter 447/448, and slot priority 426 is set to attached slot priority 456.) Prior to the slot write, the slot write counter is incremented by updating its low part 448 and, if necessary, high part 447. Players using nonvolatile memory with a limited lifetime (e.g., many flash and EEPROM memories are rated at 1 million write cycles) may reject writes if too many (e.g., more than 128) writes have been performed since power up/media insertion. The write operation resets attached slot identifier 454 and attached slot priority 456 both to zero. The return value is a status code indicating whether the write was successful.

Slot priority management support is provided to balance several potentially-conflicting objectives, including: (a) content should have access to as much nonvolatile memory as it might reasonably need; (b) content should have confidence that its nonvolatile memory will not be overwritten unexpectedly; (c) one title should not be able to reserve an excessive amount of nonvolatile memory and thereby preclude other titles from being able to reserve any; (d) if no empty slots are available in the nonvolatile memory, rarely-used slots should be recycled to provide new content with some nonvolatile storage; and (e) a title should not be able to submit large numbers of requests designed to cause legitimate slots to be recycled. In general, slots with higher priorities are less prone to be overwritten if a player runs out of slots. In an exemplary embodiment, priority rules are designed to ensure that each media title is able to have at most one top priority slot (priority 7). In addition, media are only allowed to create one slot with priority of 2 or greater on each insertion or player power cycle. Content cannot create slots with priorities higher than 7, although slots reserved when players are manufactured can have higher priority levels.

Figure 5:
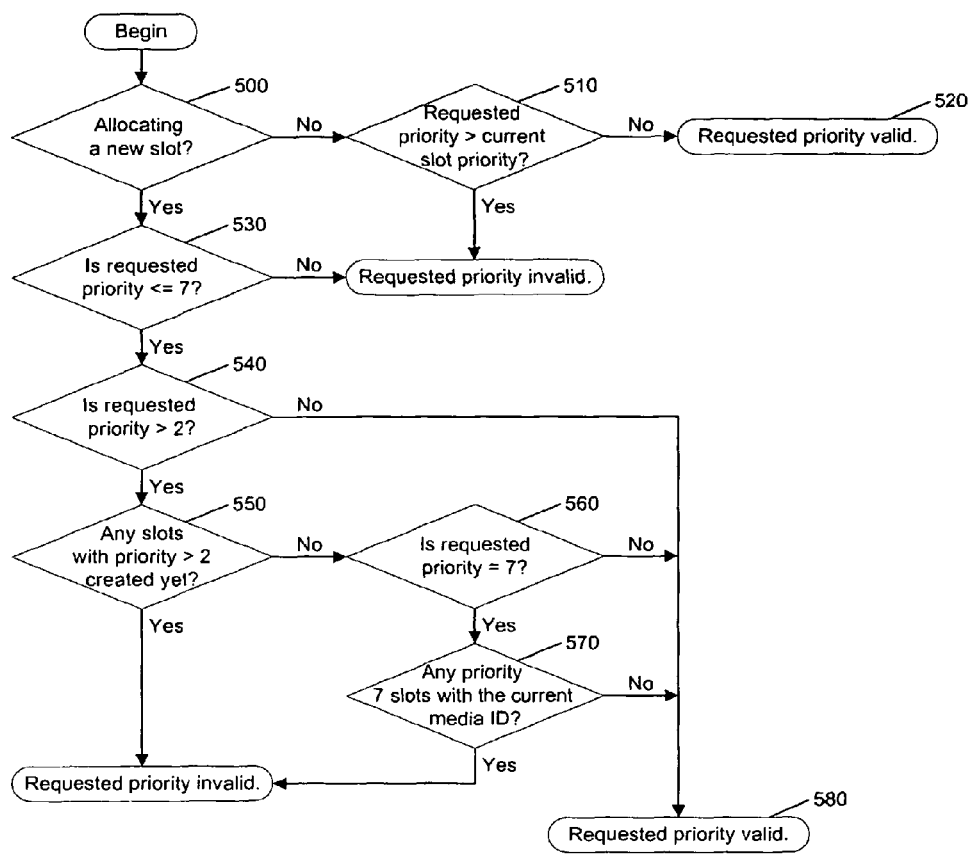
FIG. 5 illustrates an exemplary validation process when attaching to a nonvolatile memory slot.

FIG. 5 illustrates an exemplary process for validating the whether the requested priority for an attached slot is acceptable. When a slot is attached or created (see SlotAttach above), the content specifies a requested priority value. At step 500, the player checks whether a new slot is being allocated (e.g., the slot number is specified as −1). If so, at step 510, the player checks whether the requested priority exceeds the slot's existing priority 426 and, if so, returns an error indicating that the requested priority is too large. Otherwise, at step 520, the attachment request is allowed to proceed using the requested priority. If step 500 concludes that the request is to allocate a new slot, the player checks at step 530 whether the requested priority is 7 or less and, if not, returns an error. Otherwise, at step 540, the player checks whether the requested priority exceeds 2 and, if not, the requested priority is accepted as valid for allocating a slot. Otherwise, at step 550, the player checks max create priority 458 to determine whether any slots with priority larger than 2 have already been created since the media was inserted or the player was reset and, if so, the requested priority is rejected. Otherwise, at step 560, the player checks whether the requested priority is 7 and, if not, the requested priority is accepted as valid for allocating a slot. Otherwise, at step 570, the player checks whether there is already a priority 7 slot whose stored creator media ID 420 is equal to the current media ID 452, and if so, rejects as invalid the requested priority. Otherwise, the requested priority is accepted for allocating a slot.

When a new slot is allocated (i.e., the content calls AttachSlot with slot −1), the player selects the slot with the lowest priority 426 for overwriting. At the factory, empty slots are initialized with the lowest possible priority (zero), and therefore will generally be used first. If multiple slots share the lowest priority, then the slot with the lowest write sequence counter is selected. If a slot with priority 6 or 7 is selected for overwriting, the corresponding counter (priority 6 overwrite count 445 or priority 7 overwrite count 446) is incremented. Alternatively, players with space for a very large numbers of slots may simply fail if a request would require or otherwise involve overwriting a high-priority slot.

At the factory, some slots can be initialized with predetermined values for the authentication hash 432 and a nonzero slot priority. The functionality and/or security requirements for the slot depend on code that is hashed. By way of example, the code used to formulate a predetermined authentication hash may be configured to perform the following steps: (a) initialize all registers (e.g., stack pointers, etc.) to "safe" values; (b) load an RSA signature value from a predetermined address outside of the authenticated code area; (c) using a public key embedded in the region authenticated by the AttachSlot operation, determine whether the RSA signature is a valid signature over a region of the interpreter's memory; and (d) detach from the current slot (e.g., by attaching to generally-accessible slot 0) if the RSA signature is invalid, but otherwise jump to the first address of the region that was digitally signed. If the digitally-signed code is only intended to be played on a specific player, the code may, for example, be configured to check the identity (or other attributes) of the player and/or use player keys to decrypt a portion of the code before running it.

The example in the preceding paragraphs illustrates a method for implementing asymmetric signature validation (e.g., as described in the section entitled "Secure Memories and Counters") using a hash-based slot validation scheme. This approach allows slots to be reserved for future use, where the future use does not need to be specified when players are manufactured or standards are defined. It is also possible to use a public-key based code validation system to sign code that implements a hash-based approach.

It is possible to use a single slot for multiple purposes. For example, multiple code segments can be digitally-signed to pass a verification process such as the one described above. Each of these code segments can be configured to modify a different portion of the slot and properly detach when completed.

Private data field 428 of the slot is also noteworthy, since it makes it possible for code to encrypt slot contents. Although any content can read the main slot payload, only code that has been authorized (e.g., using the SlotAttach process) can read private data 428. Authorized code can therefore use private data 428 as a key (or to derive a key) to encrypt and decrypt slot contents. In this way, the privacy of data stored in slots can be assured. If desired, content also has the ability to place authentication codes or digital signatures on slot contents. Such signatures can be generated by the content code (optionally using player keys), can be generated by the player, or can be generated by an external party or device (such as the publisher of a title or the player manufacturer).

Subsequent titles can then be configured to search through all slots, searching for a digitally-signed (or otherwise authenticated) values indicating (for example) that certain security checks are necessary or a particular media ID has been revoked.

Slot-based features can be shared by multiple titles. For example, it is possible to implement a date manager which provides content with the latest known date. Each title that uses this capability would carry a digitally-signed representation of the current date when it was mastered and some predetermined code matching the slot's authentication hash 430. The code for managing the slot would (a) check a digital signature on the date carried with the content and, if invalid, detach from the slot and stop; (b) read the current slot contents; (c) compare the now-verified date from the title with the date in the slot's payload 432; (d) if the title's date is later, place the title's date in the slot contents and call SlotWrite to store the new date in the nonvolatile memory while leaving the rest of the slot unchanged; (e) detach from the slot, and (f) erase from RAM the slot private data (as well as any other non-essential values). The operation would return either an error or the later date value (i.e., the later of the authenticated date carried with the title and the date previously stored in the slot). The code can optionally store the digital signature with the date so that corrupted dates will not be misinterpreted as being far in the future. In addition, the date can also be stored encrypted (e.g., using the value of private data field 428 as a key) to limit read access to the stored date value to titles that include a current date. Date values in the player may, for example, be used by content to determine whether security updates are needed, whether on-line security checks are due, whether pay-per-view purchase records are due to be submitted, etc.

In some embodiments (e.g., those providing real-time network capabilities), it may be advantageous to have the player limit access to nonvolatile memory when network support is enabled. This limitation can help assure users' privacy, for example by preventing malicious content from extracting data from the nonvolatile storage and transmitting it over a network. As a specific example, titles that use network access capabilities may be prevented from reading data from slots (or from reading certain slots, such as those that might contain user-identifying information or were created by other titles). Players may also allow titles to terminate their network access privileges and obtain broader slot access (e.g., to obtain values for forensic watermarks once network access is no longer required). Note that information embedded in forensic watermarks does not raise the same privacy concerns, since this data can only be recovered from copies of the content.

The specific nonvolatile memory management descriptions above are intended to illustrate particular embodiments. Many variations are, of course, possible. For example, the specific slot configuration, slot management operations, and priority management approaches are provided for illustrative purposes. Rather than allocating memory in slots of fixed size, other memory management approaches may be employed (including using allocation methods that are not based on slots). Other access control mechanisms (such as those that are not based on media identifiers) may also be employed. The total amount of nonvolatile memory for slots may be variable (or effectively unlimited, as in the case of hard disks or other high-capacity storage technologies). Separate nonvolatile storage capabilities may be included for tracking media/disc insertion histories. It may be advantageous to use cryptography to encrypt and/or authenticate the contents of nonvolatile memory (or other memories, such as the memory accessible by the content) to prevent unauthorized reading/modification. In software implementations, a variety of code, address, data, and algorithm obfuscation techniques may be employed to prevent extraction of (or tampering with) player keys. Any manner of data may also be stored in slots, including, without limitation: pay-per-view purchase records; counters of any kind (e.g., purchase counters, credit/debit or other balance counters, failure counters, media/disc insertion counters, etc.); results of on-line or telephone-based security checks; viewing records/histories; code (interpretable or native); revocation data (for players, peripherals, etc.); signals to other titles; information used to evaluate qualification for rebates or discounts; transaction and playback history data; digital signatures; and keys.

Media Revocation

One noteworthy scenario is the situation where a player is trustworthy, but the media has been pirated. This is a typical situation for professional pirates, since they will generally seek to provide a "product" that is as close as possible to legitimate copies. All off-line media playback devices are potentially susceptible attacks of this nature if pirates develop methods for producing copies of legitimate media that players cannot physically distinguish from the originals. Hard-to-copy media features (such as measurements of wobble characteristics of tracks on optical discs) may be employed to make exact duplication more difficult, but sufficiently determined pirates may still find ways to make copies. Similarly, forensic watermarking allows content owners to identify (among other things) equipment used to pirate previous content, but does not prevent pirated content from being played.

To address the risk of pirates producing unauthorized copies of media, content owners can place a unique per-copy identifier on legitimate media. For optical discs, this data can be placed in a region that can be uniquely written in at the factory (such as the burst cutting area found on some existing stamped optical discs) or on recordable disc portions (e.g., utilizing storage technologies such those currently used to make recordable CDs and DVDs, magnetic discs, etc.). The uniquely-writable region only needs to carry a small amount of information (e.g., a few bytes to a few hundred bytes). In particular, this area can carry recorded serial numbers, user information (name, telephone number, etc.), cryptographic keys, etc. as well as digital signatures authenticating these values. For consumer-recordable media, a unique media serial number (and optionally an associated digital certificate) can be recorded for each piece of blank media that is manufactured. The content code on media can be configured so that when media is inserted for playback, the authenticity of its unique data is verified. Depending on the media type and the data recorded, this verification process would typically include verifying a digital signature that is unique to the piece of media. To prevent adversaries from bypassing this verification check, verification can be performed using obfuscated code, checks can be performed multiple times (e.g., at various times during playback), and verification results can be integrated with subsequent decryption processes. If the unique data is invalid, the content code would typically reject playback. Otherwise, the content code gains confidence that either (a) the media is legitimate or (b) it was copied from a piece of legitimate media that had the unique data provided.

Next, to determine whether the unique media is valid or revoked, the content checks the player's nonvolatile memory area for data fields indicating the revocation status of the currently-inserted media. If no matching revocation information is found, the media is assumed to be valid. To prevent inadvertent or malicious revocation, revocation data can be authenticated by checking digital signatures or other authenticating data (such as a pre-image to a cryptographic hash). The data in the player's nonvolatile memory can also indicate what action, if any, is recommended, such as (a) notifying the user that the copy is illegal, (b) allowing playback to proceed at reduced resolution, (c) preventing playback altogether, or (d) allowing the user to legitimately purchase the content (e.g., by calling a telephone number and entering an unlock code, or by interacting with a server over the Internet). The nonvolatile memory can also over-ride previous revocation messages, e.g. so that content can be "unrevoked" if desired. If multiple conflicting status indicators are present, a serial number or date may be used to determine which is latest.

In some cases, it is useful to create media that is only playable on specifically authorized devices, such as those that are pre-registered. In this case, instead of providing revocation, unique media information can be used to enable media activation. For example, advance review copies and pre-production copies generally do not need to be (and should not be) playable on all players. Data recorded in the writable portion can include decryption keys or other information specific to the authorized recipient(s) of each piece of media. The uniquely-recorded region can also include names, e-mail addresses, account numbers, or other data identifying the specific recipient (e.g., for forensic watermarking purposes, interactive features, etc.) or characteristics of the recipient (e.g., viewing preferences, authorization data, group identifiers, zip codes, etc.). These fields can also be written during or after the sale of the media, for example as an activation step that prevents shoplifted media from being played (thereby reducing the risk of shoplifting to stores that display media on their shelves). Back-end systems can reimburse merchants for media that is never activated, or charge merchants for media when it is activated. Another use for this capability is to distribute "locked" media prior to an official release date, then write keys that enable playback on the writable area when playback is to be authorized. Information can be recorded by an entity or facility other than the one that manufactured the media, e.g. a retail facility, a shipping facility, or a security agent (e.g., if the pressing facility is not completely trusted). If end-user devices can write portions of the media, it is also possible to record data (such as authorization keys, player identifiers, etc.) when the media is played or unlocked. Writable portions on media can, for example, be used to implement features such as "bonus" material that can be unlocked for a fee then played on multiple players.

For off-line players, revocation notifications typically would be delivered on subsequent titles. For example, new titles can carry lists of serial numbers (with accompanying authenticating data) identifying media that have been revoked. If the player has adequate nonvolatile storage (e.g., a hard drive), revocation lists can be stored by players in their entirety. Otherwise, the revocation data can be checked against the player's insertion history and/or nonvolatile memory slots to determine whether any media that have been played by the player are revoked. If so, the corresponding revocation data is stored in the player's nonvolatile memory. With this approach, pirated "clone" media will play the first time it is inserted, but will become revoked (or otherwise "flagged") when a piece of media is inserted that revokes the pirated media. In general, media revocation is valuable because it makes pirated media less attractive to consumers than legitimate media.

Media activation/revocation can be used to implement a variety of promotional and security features. For example, a movie may be sold with multiple media containing different versions (e.g., wide-screen, pan-scan, Directors' cut, etc.) To prevent people from selling or renting such media separately, their content code can verify that one or more other media are represented in the player's nonvolatile memory. Optionally, the other media can also be required to have been inserted recently (e.g., within a certain amount of time or a certain number of increments to slot write counter 447/448). As another option, the media can also require that the user insert another piece of media during playback (e.g., by loading a key value from the other media). A promotion can be created where users are given access to bonus material if they have played certain combinations of other media. Of course, playback decisions also be linked to other information, such as characteristics of the player and/or playback environment.

Players with on-line capabilities can check the revocation status of the currently-inserted title, as well as other titles represented in the player's media insertion history and/or nonvolatile memory slots. This check can be implemented in content code or can be performed by players. On-line checks can also be used to detect the case where multiple players are simultaneously playing a single piece of media (e.g., indicating that the media has been pirated) or an excessive number of players have used a particular piece of media (e.g., indicating that it has been rented in violation of a license agreement).

Pirates may try to bypass revocation checks by modifying the content's code. In this case, subsequent portions of the code (e.g., code executed later during playback) can detect the modification, for example by repeating the check or by reloading and verifying portions of the media containing the verification code. Revocation check results can also be integrated with decryption processes.

Of course, variations on the media revocation approach can be employed. For example, players can store digitally-signed interpreted code configured to identify revoked media. These code snippets can be executed each time media is inserted to determine whether the newly-inserted title is revoked. Titles would be able to store revocation checking code (preferably with corresponding digital signatures that would be verified by players), which the player would retain for checking future media. Media revocation checking can also be performed by code in the player's ROM, for example by storing in the player's nonvolatile memory a table of revoked optical discs' sector numbers and hash values. If media is writable, the content may also store and obtain revocation data on the media itself (or may store data of any other kind and purpose on the media, such as user preferences, user information, etc.).

Media may also be used to carry revocation data about recording devices. For example, if consumer recording devices are configured to place identifying data on their recordings, player devices can maintain records of revoked recorders. These records may be updated by revocation data carried on media. Recordable media can also be manufactured with information identifying revoked recorders to prevent revoked recorders from writing to the media. Revocation-related data fields may be cryptographically authenticated, for example to prevent malicious or inadvertent revocation of legitimate devices. For example, the identifying data placed by recording devices may include a recorder digital certificate and a digital signature on a media serial number. Identifying data placed on recordable media may be encrypted (for example with the public key of a third-party agent) to protect the privacy of users. Threshold cryptography may also be employed, for example to require multiple media to identify a recording device. (Note that threshold cryptography may also be employed in other aspects of the technologies disclosed herein, for example with forensic marks to ensure that a certain amount of copied material is required to recover the mark.)

One other use for media revocation is to provide an additional deterrent against casual piracy in addition to other approaches that are available. The data embedded in forensic watermarks can identify previous media played by a device. Depending on implementation choice, it may be advantageous to revoke other media whose IDs were determined from a pirate copy's forensic watermarks, revoke recordable media whose serial numbers are close to those used to distribute pirated material, require additional authorization steps prior to the playback from questionable media, etc.

Miscellaneous Features and Capabilities

Security Over-Ride Keys: Content can be designed such that players with knowledge of a security over-ride key can bypass some or all security checks, allowing access to part or all of the content. By supporting such keys, content owners can grant access to limited portions of a work (e.g., if a jurisdiction required that content owners grant critics "fair use" access to video on a frame-by-frame basis). These over-ride keys can also be used to "release" content from its protected form, for example if protection features are designed poorly (creating playability problems). If desired, these keys may be escrowed with a third party (or stored on the media encrypted with the third party's public key). Over-ride keys can also be schedule to be released when copyrights expire, e.g. to address concerns that anti-piracy mechanisms might prevent content from entering the public domain.

Multiple Round Collusion Analysis: In some situations, a determined adversary might combine output from a large number of devices in an attempt to prevent recovery of forensic watermarks. If an adversary has compromised so many devices that content is unable to identify the offending devices directly, it is possible to combine forensic information gathered from multiple content releases. For example, the information gathered from a first title may narrow the range of possible devices being used by the adversary, but not uniquely identify all offending devices. This knowledge may be used when a second title is mastered to create forensic watermarks that will provide further information about the attackers and/or their equipment. This process may be repeated until the adversaries have been uniquely identified.

Countermeasures to Malicious Interpreters: Malicious players may be designed to try to recognize security-related code in content. For example, a malicious player might attempt to identify where RSA signature verification operations are being performed by content and modify the results, e.g. to make an invalid RSA signature appear to be valid. If such players are produced, content owners can author new content to use different RSA signature computation routines that designed to evade this identification. Examples of operations that may be used include, without limitation: rewriting code to avoid unreliable operations; obfuscating code; message blinding; checking trial computations to detect attacks; and integrating intermediates and/or results with other cryptographic operations (such as decryption steps).

Interactivity: The virtual machine/interpreter may be for non-security tasks as well as security purposes. For example, content code can be used to display menus, text, graphics, animations, user interface elements, etc. to the user. Similarly, the content can receive user commands or responses, including without limitation mouse inputs (e.g., movements, clicks), button presses (such as keyboard or remote control inputs), light pen inputs, and joystick actions. Information about the local player (such as camera inputs, microphones inputs, changes in positions of users' bodies, etc.) may also be gathered and used, for example, to control the playback. Players can also provide features to assist with user interface implementation, including without limitation the ability to display dialog boxes, manage display windows, conduct voice recognition, manage user preferences, etc. As a deterrent to piracy, code implementing interactive user features can be combined with security code, such that adversaries cannot readily separate one from the other.

Audit trail management: The player may provide APIs for audit trail management, enabling content to maintain records of sequences of events in a manner that can be authenticated (e.g., by a third party, other content, future invocations of the content, etc.). Audit records can, without limitation, be secured using digital signatures (optionally with serial numbers based on a counter stored in the player), message authentication codes, hash chains, and hash trees. For applications requiring completeness of audit trails (e.g., to prevent deletion of pay-per-view purchase records), the current audit state may be maintained by the player. Audit record data may be stored within the player (e.g., in NVRAM slots managed by content, a file on a hard disk, a separate flash memory area, etc.) or externally (e.g., on an intermittently-connected network, writable portions of media, smart cards, etc.). If the local audit storage is full or if other criteria are met (e.g., the user has purchased substantial amounts of pay-per-view material), the player and/or content can require a network connection to a trusted external device or server, which can retrieve audit data and provide cryptographically-assured authorization to purge audit records. Examples of specific audit management operations which may be supported (and which may be provided by code delivered with content and/or players and/or devices accessible to players) include without limitation: submitting data for inclusion in audit trails, verifying the position and/or content of data purportedly in an audit trail, producing cryptographically-verifiable evidence that certain data is represented in an audit trail (or is a complete representation of at least a portion of an audit trail), secure storage of audit records (e.g., using encryption to prevent unauthorized code or parties from determine audit record contents) searching audit trails, and purging audit trails (e.g., after verifying a cryptographically-authenticated authorization). Auditing may also be implemented by the content itself (e.g., using hash-based slot authentication), or using separate capabilities/APIs. Although cryptographic authentication is generally preferable for audit data, this is not required.

Accessing and Exchanging Content Over Networks

Although most consumer video and audio content is currently distributed on optical media, the popularity of streaming downloads is predicted to increase over time. The security measures presented herein can be redesigned to support streaming or locally-cached content instead of, or in addition to, physical media. Instead of loading data from media physically located at the player, the content code and data are retrieved over a network. For example, instead of issuing procedure calls requesting data sectors from media, the content would issue procedure calls requesting data over a network. Unlike passive media, a remote server can itself have processing capabilities, e.g. allowing it to send requests to the content (e.g., to have the player perform cryptographic operations) and validate the results. Security protocols for protecting data exchanged over networks (including without limitation SSL) can be implemented in the content's code or in the player (or other components).

A simple server implementation would receive incoming requests from validated users (e.g., those who have paid for access to the content), read the corresponding data from its own local storage, and deliver the result. A more sophisticated server can select and/or modify the data in real time, for example to embed forensic watermarks, and interact with other servers. Servers can also store information about or on behalf of remote players (e.g., as an alternative to player-based nonvolatile memory), deliver security code customized for the end user, perform real-time revocation checks, automatically insert security upgrades into content, provide Internet/web proxy capabilities, and supply other services to content code. For example, an exemplary transaction includes the following steps: (a) a content server receives a purchase request from an end user's player; (b) the content server verifies the payment; (c) the content server transmits a portion of interpretable code configured to analyze the functional and/or security properties of the user's player; (d) the user's player runs the interpreted code and returns information about its properties; (e) the content server analyzes the response and transmits security verification logic (which includes interpreted and/or native code, and may be custom-generated) to the user's player; (f) the user's player processes the verification logic and returns a response to the server; (g) the server validates the response; (h) the content server transmits (e.g., streams) encrypted digital content (e.g., audio, video, and/or images) to the user's player; and (i) the user's player decrypts the content (where correct operation of the decryption process may require correct keys or results from the security verification logic).

The server process can itself be controlled by interpreted code, optionally using the same interpreter architecture (e.g., DLX) as the player side. This has the benefit that content can be authored without regard for the server's physical hardware architecture. For home network environments, this is a particularly attractive model, since the security and decoding "intelligence" remain at the server, while content can be streamed out to authenticated local devices. Similarly, for content that will be streamed over a variety of different Internet services, server-side interpreters can allow content to be authored once and streamed from any compatible service.

In some cases, a recipient device may also possess the ability to make its own security decisions, such as in the case where a receiving device wishes to cache content and later transmit it to subsequent devices whose identity is not known during the initial transfer. In this case, the initial transfer may include interpretable and/or natively executable code for use by the recipient device in making its security-related decisions. It is not necessary that that all devices support the same interpreter or programmable technologies, as the code run by the transmitting device does not necessarily have to be the same as the code by the receiving device.

In some situations, multiple servers and/or content transfers may be involved. For example, content may include security code obtained from multiple entities, including (for example) servers operated by both player manufacturers and content owners. In some personal computer environments, it may also be useful to use multiple interpreters. For example, interpreters may be included in the media interface (e.g., an optical disc drive), the operating system, the application software (e.g., the player), output devices (e.g., an amplifier), etc. Alternatively or in addition, cryptographic oracles may also be provided in components.

Additional Considerations and Variations

In an exemplary embodiment, content can be customized for specific players. In this case, the content is playable only on a single player or small number of players, but code that is not required for playback on the recipient device(s) does not need to be transmitted. Thus, this approach is of particular value when it is difficult, expensive, or slow to send information to users, e.g. if storage space is limited or of the content must be sent over a slow network connection. The content can still, however, query the player to verify that the playback environment is suitably secure.

To ensure that playback is not interrupted or distorted, it can be helpful to require specific minimum performance standards for the players' interpreters.

In an exemplary embodiment, the systems and methods can be configured to allow content to be exchanged from one device to another. The specific security characteristics of such exchanges depend factors such as whether on-line communication with a trusted (e.g., publisher-operated) server is available. The form in which the content is transferred depends on the security policies enforced by the content and the devices' hardware capabilities. For example, in one embodiment where both devices include secure interpreters, the sending device transmits the raw encrypted content (as stored on the original media or encrypted with another key, optionally with watermarks included) along with code for controlling the playback. The playback control code can be customized by the sending device for the recipient device. In another case, the sending device may verify that the security characteristics of the output port and destination device are acceptable, negotiate a shared key with the destination device, decrypt and watermark the content, re-encrypt the content with the shared key, and send the re-encrypted content to the destination.

Players with adequate nonvolatile storage can be used to store updateable code that is called from the interpreter. For example, the player can be configured to always store the latest security code for a particular publisher. In this case, if a newer version of the security code is encountered, the old version will be updated (e.g., after verifying a digital signature on the new code). In this way, older content can benefit from security updates carried on new content. (This approach can, for example, be implemented using the secure memory method described previously.) In another embodiment, content can require that players include current security updates by obtaining the current date/time from the player and comparing against the date/time of the latest known security upgrade. In this manner, content can ensure that players have reasonably up-to-date security upgrades.

In general, content protection systems should avoid playing any visible role in legitimate actions by legitimate users. Nevertheless, some user interface elements are necessary, such as for reporting errors or providing information. In the case where content can select between multiple supported output qualities (e.g., a "legacy" quality if the player provides inadequate security and a "high" quality if security is satisfactory), an indicator can be useful to notify the user of the output quality. For example, in one embodiment, a green light emitting diode (LED) under the control of the content indicates that output is of high-quality (i.e., the security is satisfactory), an orange LED indicates reduced quality (i.e., marginal security), and a blinking red LED can indicates that no output is provided because the player is revoked. In another embodiment, a brief spoken or written notice (in the user's language, if known) is provided to report the status of the security. The decision whether to report and/or use the higher quality versus the lower quality output can be based on other factors, such as the presence and/or absence of a robust and/or fragile watermark. If necessary, a degradation module can be included with the player to enable the content to reduce the quality of playback (e.g., to the quality of a legacy format) for security or other reasons. (Degradation modules can, for example, be included to convert high-definition television signals to NTSC-resolution or to convert high-resolution multi-channel audio into 2-channel CD-quality audio.)

If the media interface and player interpreter offer adequate performance, bulk decryption and watermark embedding can be handled in the interpreter instead of in a separate decryption module. Allowing the content to decrypt itself directly can provide some security benefits, such as ensuring that attackers will not mount attacks against the decryption module. If the interpreter performance is adequate, it is also possible to implement the content decompression in the interpreter as well, avoiding the need to standardize a single player Codec type.

While implementation using an interpreter is preferable on platforms (such as personal computers) that do not have specific hardware support for the techniques and systems disclosed herein, it is possible to implement many of the interpreter functions in dedicated hardware. Depending on the application, dedicated implementations may have cost or power consumption savings, although provide reduced functionality.

Embodiments that receive content on physical media can use virtually any media format. While optical discs (such as CD and DVD) provide high storage densities at low cost, other storage systems can also be employed, including without limitation magnetic media, holographic memories, battery-backed RAM, ROM, EEPROM, and flash memory. The storage capacity of the media can be used for storing data of many different types, including information related to the techniques and systems disclosed herein (such as executable programs that implement decoding methods for various computer platforms, content protected using methods disclosed herein, etc.) as well as data that is not directly related to the techniques and systems disclosed herein (such as unrelated executable programs, unprotected content such as Red Book CD audio, content protected using other security schemes, etc.).

Media can include tamper-resistant circuitry for performing cryptographic computations to enable players to verify that the media is not an unauthorized copy. Although such capabilities are simplest to implement for media that use electrical interfaces, even optical media can include cryptographic capabilities. For example, a contactless cryptographic module (such as the contactless smart card of U.S. Pat. No. 5,640,306 to Gaumet et al.) can be affixed to or embedded in an optical disc. While cryptographic media authentication is preferable, other authentication mechanisms can be employed instead. For example, general media authentication methods known in the background art include writing serial numbers to difficult-to-copy locations (such as regions that are not writeable using commercially recordable media or drives) and including a digitally-signed "description" of various characteristics of the original physical media. Of course, cryptographic mechanisms offer the advantage that, even if attackers discover methods for compromising existing media, future media can be issued with improved security without requiring any changes to the player.

Because many consumers already have an investment in content on legacy formats, players implementing the techniques and systems disclosed herein may be configured to support these legacy formats. Similarly, different versions of the interpreter may be supported by a particular player. In this case, the player needs to analyze the media or content to identify the appropriate security system to use. For example, a digital video player might detect whether the disc is a legacy DVD using CSS (and, if so, select a CSS decryption system) or is a DVD using the techniques and systems disclosed herein (and, if so, activate a language-based decryption system). Robust watermarks included in the content can be used to detect if content that was originally protected with one security system has been copied to a format lacking the original protections. For example, content that does not allow copying could include a watermark to indicate that any devices that encounter a copy in any other format (e.g., in an unprotected format) can recognize the copy as unauthorized and (for example) refuse playback.

The techniques and systems disclosed herein can be used with a wide variety of content types, including without limitation audio, still images, video, 3-dimensional images, and 3-dimensional video.

The techniques and systems disclosed herein can also be implemented in a variety physical devices. If only one device is responsible for decrypting content, it is preferable to have security policies enforced by that device. However, output devices and intermediate processing devices (such an audio equalizer or mixer), can also benefit from the techniques and systems disclosed herein and/or by providing query capabilities that can be used by such techniques and systems to verify their security. In one embodiment, a home entertainment server downloads, stores, and manages content, and forwards content to playback devices (speakers, headphones, video displays, etc.) whose security has been successfully verified. Connections to these devices are encrypted, preferably under the joint control of the techniques and systems disclosed herein and the destination device, to prevent theft of content in transit.

We claim:

1. An method executed by one or more computing devices for secure access to a nonvolatile memory, comprising:
   receiving, by at least one of the one or more computing devices, a request for privileged access to nonvolatile memory from requesting code, wherein the request includes a code length of the requesting code and a requested priority level;
   computing, by at least one of the one or more computing devices, a cryptographic hash of the requesting code using a starting address of the requesting code and the code length;
   determining, by at least one of the one or more computing devices, whether the requested priority level is valid based at least in part on one or more of a previous priority level associated with a requested portion of the nonvolatile memory and a predetermined range of acceptable priority levels; and
   granting, by at least one of the one or more computing devices, privileged access to the nonvolatile memory based on one of:
      a determination that the requested priority level is valid and that the request does not specify an existing portion of the nonvolatile memory; or
      a determination that the requested priority level is valid and that the cryptographic hash matches a value of an authentication hash stored in the requested portion of the nonvolatile memory.

2. An automated method according to claim 1, wherein the request does not specify an existing portion of the nonvolatile memory and further comprising:
   allocating, by at least one of the one or more computing devices, a portion of the nonvolatile memory for the requesting code; and
   storing, by at least one of the one or more computing devices, the crytographic hash as an authentication hash in the portion of the nonvolatile memory.

3. The method of claim 2, wherein the portion of the nonvolatile memory is allocated to the requesting code based at least in part on a previous priority level associated with the portion of the nonvolatile memory.

4. The method of claim 1, wherein determining whether the requested priority level is valid comprises:
   determining whether the requested priority level is greater than the previous priority level allocated to the requested portion of nonvolatile memory; and
   designating the requested priority level as valid if it is less than or equal to the previous priority level.

5. The method of to claim 1, wherein the request does not specify an existing portion of the nonvolatile memory and wherein determining whether the requested priority level is valid comprises:
   determining whether the requested priority level is greater than a maximum acceptable priority level; and
   designating the requested priority level as invalid based at least in part on a determination that it is greater than the maximum acceptable priority level.

6. The method of claim 1, further comprising:
   setting a priority level of a portion of the nonvolatile memory to the requested priority level based at least in part on a determination that privileged access was granted.

7. The method of claim 1, further comprising:
   in response to a write operation onto a portion of the nonvolatile memory, updating, by at least one of the one or more computing devices, a write counter configured to restrict overwriting of data to the portion of the nonvolatile memory portion when the write counter is above a predetermined threshold.

8. The method of claim 7, further comprising:
rejecting, by at least one of the one or more computing devices, the write operation onto the portion of the nonvolatile memory based at least in part on a value of the write counter.

9. The method of claim 1, wherein determining whether the requested priority level is valid comprises:
determining whether the requested priority level is the maximum acceptable priority level; and
determining whether any portions of the nonvolatile memory having the maximum acceptable priority level also have an associated media identification that is the same as a media identification associated with the requesting code based at least in part on a determination that the requested priority level is the maximum acceptable priority level.

10. A system for secure access to a nonvolatile memory, the system comprising:
one or more processors; and
one or more memories operatively coupled to at least one of the one or more processors and having instructions stored thereon that, when executed by at least one of the one or more processors, cause at least one of the one or more processors to:
receive a request for privileged access to nonvolatile memory from requesting code, wherein the request includes a code length of the requesting code and a requested priority level;
compute a cryptographic hash of the requesting code using a starting address of the requesting code and the code length;
determine whether the requested priority level is valid based at least in part on one or more of a previous priority level associated with a requested portion of the nonvolatile memory and a predetermined range of acceptable priority levels; and
grant privileged access to the nonvolatile memory based on one of:
a determination that the requested priority level is valid and that the request does not specify an existing portion of the nonvolatile memory; or
a determination that the requested priority level is valid and that the cryptographic hash matches a value of an authentication hash stored in the requested portion of the nonvolatile memory.

11. The system of claim 10, wherein the request does not specify an existing portion of the nonvolatile memory and wherein at least one of the one or more memories has further instructions stored thereon that, when executed by at least one of the one or more processors, cause at least one of the one or more processors to:
allocate a portion of the nonvolatile memory for the requesting code; and
store the crytographic hash as an authentication hash in the portion of the nonvolatile memory.

12. The system of claim 11, wherein the portion of the nonvolatile memory is allocated to the requesting code based at least in part on a previous priority level associated with the portion of the nonvolatile memory.

13. The system of claim 10, wherein the instructions that, when executed by at least one of the one or more processors, cause at least one of the one or more processors to determine whether the requested priority level is valid further cause at least one of the one or more processors to:

determine whether the requested priority level is greater than the previous priority level allocated to the requested portion of nonvolatile memory; and
designate the requested priority level as valid if it is less than or equal to the previous priority level.

14. The system of claim 10, wherein the request does not specify an existing portion of the nonvolatile memory and wherein the instructions that, when executed by at least one of the one or more processors, cause at least one of the one or more processors to determine whether the requested priority level is valid further cause at least one of the one or more processors to:
determine whether the requested priority level is greater than a maximum acceptable priority level; and
designate the requested priority level as invalid based at least in part on a determination that it is greater than the maximum acceptable priority level.

15. At least one non-transitory computer-readable medium storing computer-readable instructions that, when executed by one or more computing devices, cause at least one of the one or more computing devices to:
receive a request for privileged access to nonvolatile memory from requesting code, wherein the request includes a code length of the requesting code and a requested priority level;
compute a cryptographic hash of the requesting code using a starting address of the requesting code and the code length;
determine whether the requested priority level is valid based at least in part on one or more of a previous priority level associated with a requested portion of the nonvolatile memory and a predetermined range of acceptable priority levels; and
grant privileged access to the nonvolatile memory based on one of:
a determination that the requested priority level is valid and that the request does not specify an existing portion of the nonvolatile memory; or
a determination that the requested priority level is valid and that the cryptographic hash matches a value of an authentication hash stored in the requested portion of the nonvolatile memory.

16. The at least one non-transitory computer-readable medium of claim 15, wherein the request does not specify an existing portion of the nonvolatile memory and further storing computer-readable instructions that, when executed by at least one of the one or more computing devices, cause at least one of the one or more computing devices to:
allocate a portion of the nonvolatile memory for the requesting code; and
store the crytographic hash as an authentication hash in the portion of the nonvolatile memory.

17. The at least one non-transitory computer-readable medium of claim 16, wherein the portion of the nonvolatile memory is allocated to the requesting code based at least in part on a previous priority level associated with the portion of the nonvolatile memory.

18. The at least one non-transitory computer-readable medium of claim 15, wherein the instructions that, when executed by at least one of the one or more computing devices, cause at least one of the one or more computing devices to determine whether the requested priority level is valid further cause at least one of the one or more computing devices to:
determine whether the requested priority level is greater than the previous priority level allocated to the requested portion of nonvolatile memory; and designate the requested priority level as valid if it is less than or equal to the previous priority level.

19. The at least one non-transitory computer-readable medium of claim 15, wherein the request does not specify an existing portion of the nonvolatile memory and wherein the instructions that, when executed by at least one of the one or more computing devices, cause at least one of the one or more computing devices to determine whether the requested priority level is valid further cause at least one of the one or more computing devices to:
  determine whether the requested priority level is greater than a maximum acceptable priority level; and
  designate the requested priority level as invalid based at least in part on a determination that it is greater than the maximum acceptable priority level.

* * * * *